United States Patent
Sharoni

(10) Patent No.: US 9,104,442 B2
(45) Date of Patent: Aug. 11, 2015

(54) MODIFYING THE EXECUTION OF A NATIVE APPLICATION RUNNING ON A PORTABLE ELECTRONIC DEVICE

(71) Applicant: Accenture Global Services Limited, Dublin (IE)

(72) Inventor: Dan Sharoni, Mountain View, CA (US)

(73) Assignee: Accenture Global Services Limited, Dublin (IE)

( * ) Notice: Subject to any disclaimer, the term of this patent is extended or adjusted under 35 U.S.C. 154(b) by 0 days.

(21) Appl. No.: 14/446,719

(22) Filed: Jul. 30, 2014

(65) Prior Publication Data

US 2014/0344837 A1  Nov. 20, 2014

Related U.S. Application Data

(63) Continuation of application No. 12/557,861, filed on Sep. 11, 2009, now abandoned.

(60) Provisional application No. 61/121,857, filed on Dec. 11, 2008.

(51) Int. Cl.
*G06F 9/44* (2006.01)
*H04L 29/08* (2006.01)
(Continued)

(52) U.S. Cl.
CPC .......... *G06F 9/4443* (2013.01); *G06F 9/44526* (2013.01); *G06F 9/54* (2013.01); *H04L 67/10* (2013.01)

(58) Field of Classification Search
CPC .............. G09F 9/54; G09F 8/65; H04L 67/10
USPC ....................................................... 719/310
See application file for complete search history.

(56) References Cited

U.S. PATENT DOCUMENTS

| | | |
|---|---|---|
| 5,845,299 A | 12/1998 | Arora |
| 5,909,545 A | 6/1999 | Frese |

(Continued)

FOREIGN PATENT DOCUMENTS

| | | |
|---|---|---|
| EP | 1172726 A2 | 7/2001 |
| EP | 1126681 A2 | 8/2001 |

OTHER PUBLICATIONS

Scott M. Lewandowshi, Frameworks for Component-Based Client/Server Computing, Mar. 1998.*

(Continued)

*Primary Examiner* — Lechi Truong
(74) *Attorney, Agent, or Firm* — Fish & Richardson P.C.

(57) ABSTRACT

Methods, systems, and apparatus, including computer programs encoded on computer storage media, for sharing enterprise data. One of the methods includes receiving data that specifies one or more updated conditions under which a first server-based enterprise application and a second server-based enterprise application may share certain enterprise data from a portable computing device that includes (i) a first native enterprise application that corresponds to the first server-based enterprise application, (ii) a second native enterprise application that corresponds to the second server-based enterprise application, and (iii) data that specifies one or more conditions under which the first server-based enterprise application and the second server-based enterprise application may share the certain enterprise data, and modifying execution of the first native enterprise application or the second native enterprise application to reflect the updated conditions under which the first server-based enterprise application and the second server-based enterprise application may share the certain enterprise data.

15 Claims, 17 Drawing Sheets

(51) Int. Cl.
  *G06F 9/445* (2006.01)
  *G06F 9/54* (2006.01)

(56) References Cited

U.S. PATENT DOCUMENTS

| | | | |
|---|---|---|---|
| 5,984,299 | A | 11/1999 | Hirota et al. |
| 6,011,637 | A | 1/2000 | Pfeiffer |
| 6,266,098 | B1 | 7/2001 | Cove |
| 6,477,550 | B1 | 11/2002 | Balasubramaniam |
| 6,574,635 | B2 | 6/2003 | Stauber et al. |
| 6,725,238 | B1 | 4/2004 | Auvenshine |
| 6,738,975 | B1 | 5/2004 | Yee |
| 6,784,900 | B1 | 8/2004 | Dobronsky |
| 6,801,244 | B2 | 10/2004 | Takeda |
| 6,957,390 | B2 | 10/2005 | Tamir |
| 7,159,192 | B2 | 1/2007 | Dobronsky |
| 7,412,655 | B2 | 8/2008 | Wada |
| 7,546,571 | B2 | 6/2009 | Mankin |
| 7,895,336 | B2 | 2/2011 | Cameron |
| 2001/0051907 | A1 | 12/2001 | Kumar |
| 2002/0063735 | A1 | 5/2002 | Tamir |
| 2002/0116453 | A1 | 8/2002 | Todorov |
| 2002/0140729 | A1 | 10/2002 | Price |
| 2002/0157023 | A1 | 10/2002 | Callahan |
| 2003/0070005 | A1 | 4/2003 | Mukundan |
| 2003/0163784 | A1 | 8/2003 | Daniel |
| 2004/0100490 | A1 | 5/2004 | Boston |
| 2004/0109013 | A1 | 6/2004 | Goertz |
| 2005/0027584 | A1* | 2/2005 | Fusari ............................. 705/9 |
| 2005/0075115 | A1 | 4/2005 | Corneille |
| 2005/0114798 | A1 | 5/2005 | Jiang |
| 2005/0198158 | A1 | 9/2005 | Fabre et al. |
| 2005/0213763 | A1 | 9/2005 | Owen et al. |
| 2005/0223109 | A1 | 10/2005 | Mamou et al. |
| 2005/0278543 | A1* | 12/2005 | Tsuda et al. .................. 713/182 |
| 2006/0005207 | A1 | 1/2006 | Louch |
| 2006/0031494 | A1 | 2/2006 | Marcus |
| 2006/0070090 | A1* | 3/2006 | Gulkis .......................... 719/328 |
| 2006/0075112 | A1 | 4/2006 | Polozoff |
| 2006/0106806 | A1* | 5/2006 | Sperling et al. ................. 707/10 |
| 2006/0107217 | A1 | 5/2006 | Lu |
| 2006/0250578 | A1 | 11/2006 | Pohl |
| 2007/0033262 | A1 | 2/2007 | Labelle |
| 2007/0038934 | A1 | 2/2007 | Fellman |
| 2007/0101297 | A1 | 5/2007 | Forstall |
| 2007/0207777 | A1 | 9/2007 | Owen |
| 2007/0255715 | A1 | 11/2007 | Li |
| 2007/0282858 | A1 | 12/2007 | Arner |
| 2008/0009272 | A1* | 1/2008 | Toledano .................. 455/414.1 |
| 2008/0082934 | A1 | 4/2008 | Kocienda |
| 2008/0194276 | A1* | 8/2008 | Lin et al. ...................... 455/466 |
| 2008/0195954 | A1 | 8/2008 | Dharmarajan |
| 2008/0297485 | A1 | 12/2008 | Park |
| 2009/0055749 | A1 | 2/2009 | Chatterjee |
| 2010/0100825 | A1 | 4/2010 | Sharoni |
| 2010/0153866 | A1 | 6/2010 | Sharoni |

OTHER PUBLICATIONS

ACNR-D09-026-02078-00-US_Application and Figures as Filed Sep. 11, 2009.
ACNR-D09-026-02078-00-US_Advisory Action Mail Date Feb. 25, 2013.
ACNR-D09-020-02070-00-U.S. Appl. No. 12/436.341 Application and Figures as Filed.
ACNR-D09-020-02070-00-U.S. Appl. No. 12/436,341 Office Action Dated 11123/2013.
Collins English Dictionary, 2003, "application program", thefreedictionary.com/application+program, pp. 1-2.
U.S. Non-Final Office Action for U.S. Appl. No. 12/557,861 dated Jun. 6, 2012, 14 pages.
U.S. Non-Final Office Action for U.S. Appl. No. 12/557,861 dated Dec. 18, 2012, 13 pages.
U.S. Non-Final Office Action for U.S. Appl. No. 12/557,861 dated May 30, 2014, 18 pages.
Australian Office Action in Application No. 2012258448, issued Sep. 22, 2014, 2 pages.

* cited by examiner

MODIFYING THE EXECUTION OF A NATIVE APPLICATION RUNNING ON A PORTABLE ELECTRONIC DEVICE

RELATED APPLICATIONS

This application is a continuation of U.S. application Ser. No. 12/557,861, filed Sep. 11, 2009 (now abandon), published as U.S. 2010-0153866, which claims the benefit of U.S. Provisional Application No. 61/121,857, filed Dec. 11, 2008. Both of these applications are incorporated herein by reference in their entirety and for all purposes.

This application is related to U.S. application Ser. No. 12/436,341, filed May 6, 2009. That application is incorporated herein by reference in its entirety and for all purposes.

BACKGROUND OF THE INVENTION

Information related to a business, its customers, its competitors, and the like, is commonly referred to as "enterprise data" and can be used by the business for a variety of purposes. For example, enterprise resource planning (ERP) utilizes enterprise data to implement business functions such as manufacturing, supply chain management, financials, projects, human resources and customer relationship management (CRM). Enterprise data may also be used for product lifecycle management (PLM) to help manufacturers with product-related information. As a further example, enterprise data may be used for supply chain management (SCM) and supplier relationship management (SRM) functions.

Conventional software packages for providing access to enterprise data generally require significant storage and processing resources, and thus, are generally run on desktop computer systems, server computer systems, or the like. The computer system running the conventional software package may generate a query for specific enterprise data and send the query to a system able to access the enterprise data. Once data is received from the system, it may be processed by the computer system running the conventional software package and presented to the user of the computer system.

Although enterprise data may be accessed using conventional software packages, the ability to access the enterprise data from remote locations or on the go is limited since the computer systems able to run the conventional software packages cannot be easily transported. Additionally, conventional software packages generally cannot be run on portable electronic devices such as smartphones or personal digital assistants (PDAs). Further, conventional portable electronic devices typically lack the storage and processing resources to adequately store and process the enterprise data. Thus, access to enterprise data is limited using conventional solutions.

Some portable devices allow limited access to resident enterprise applications that run on the portable device. However, these portable devices limit communication between multiple enterprise applications. Unfortunately, enterprise solutions often require multiple enterprise applications to talk to one another to obtain information, etc. As such, portable devices that restrict or prevent communication between enterprise applications offer a poor platform choice for enterprise applications.

SUMMARY OF THE INVENTION

Embodiments of the present invention are directed to a method and system for modifying the execution of a native application running on a portable electronic device. More specifically, a module or program module may be downloaded and executed by a portable electronic device to modify the execution of a native application running on the portable electronic device, where the native application accesses enterprise data generated by a remote system and displays content associated with the enterprise data on the portable electronic device. The module may enable modification or enhancement of the appearance and/or behavior of a graphical user interface generated by the native application (e.g., by replacing some or all of the program instructions of the native application used to implement the graphical user interface). The module may enable alteration of the data sharing between enterprise applications running on the remote system which generate the enterprise data accessed by the native application and displayed using the graphical user interface. The module may also modify at least one program portion of the native application which would modify the functionality of the native application in general.

In one embodiment, a method of modifying execution of an application on a portable electronic device includes downloading a program module to the portable electronic device in response to a request for a program module. A graphical user interface is displayed on a display device of the portable electronic device responsive to execution of a first application on the portable electronic device, wherein the displaying further includes rendering content on the portable electronic device that is associated with execution of a second application on a remote system, and wherein the first application controls the manner in which the content is accessed and displayed on the display device. At least one feature of the graphical user interface is modified responsive to execution of the program module on the portable electronic device.

In another embodiment, a portable electronic device includes a processor, a memory coupled to the processor, a display device coupled to the processor, and a user input device coupled to the processor. The portable electronic device also includes a first application operable to display a graphical user interface on the display device, and wherein the first application is further operable to render, on the display device, content associated with execution of a second application on a remote system. The portable electronic device further includes a program module operable to modify at least one feature of the graphical user interface, wherein the program module is downloaded to the memory responsive to a request for the program module.

And in yet another embodiment, a portable electronic device includes a processor, a memory coupled to the processor, a display device coupled to the processor, and a user input device coupled to the processor. The portable electronic device also includes a first application operable to display a graphical user interface on the display device, wherein the first application is further operable to render, on the display device, content associated with execution of a second application on a remote system, wherein the first application is further operable to track user navigation through the content rendered on the display device, and wherein the first application is further operable to re-render, on the display device, a previously-displayed portion of the content responsive to a user input to a user input device of the portable electronic device. The portable electronic device further includes a program module operable to modify at least one feature of the graphical user interface, wherein the program module is downloaded to the memory responsive to a request for the program module.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
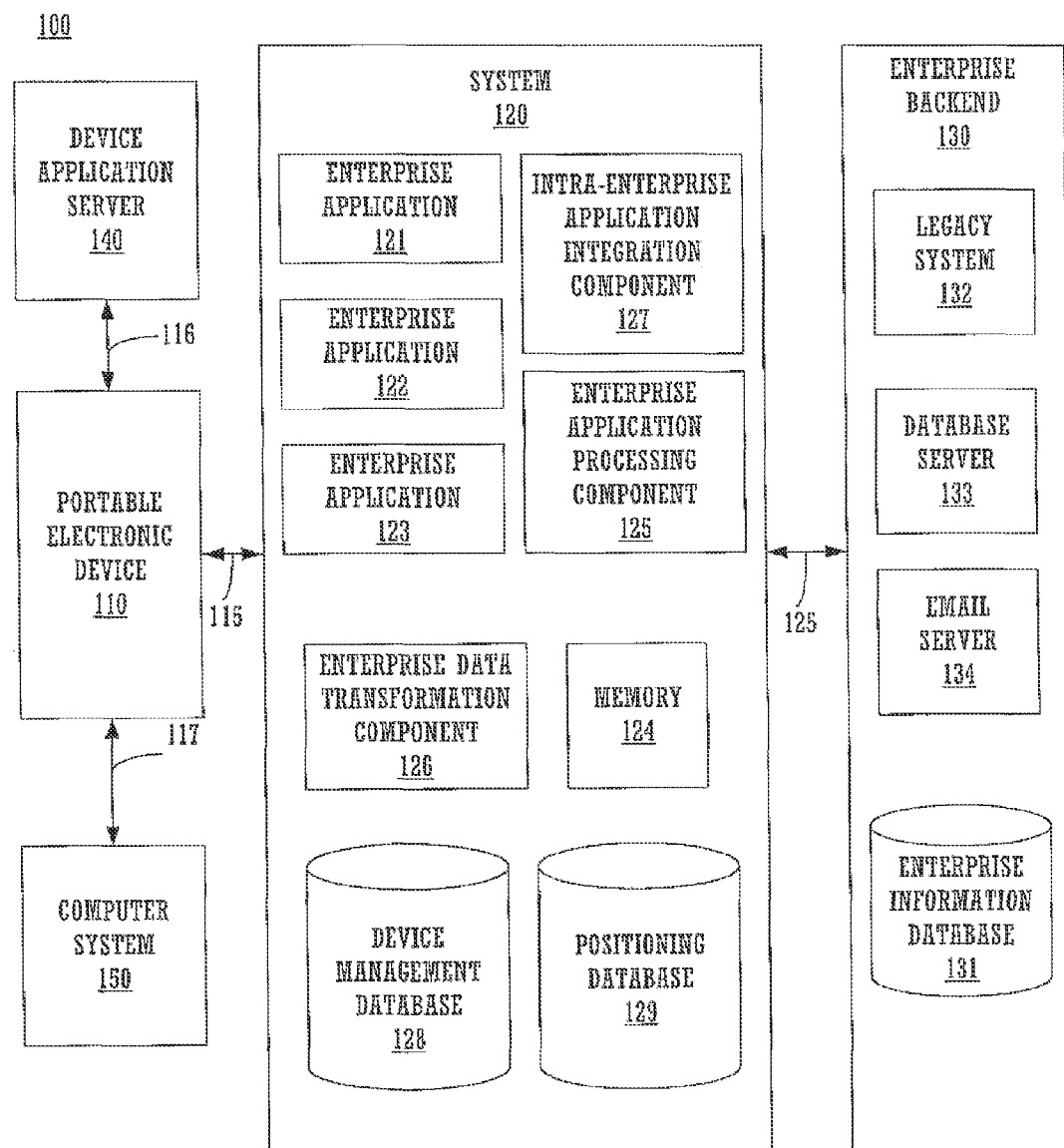
FIG. 1 shows an exemplary system for providing access to enterprise data on a portable electronic device in accordance with one embodiment of the present invention.

Reference will now be made in detail to embodiments of the present invention, examples of which are illustrated in the accompanying drawings. While the present invention will be discussed in conjunction with the following embodiments, it will be understood that they are not intended to limit the present invention to these embodiments alone. On the contrary, the present invention is intended to cover alternatives, modifications, and equivalents which may be included with the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Notation and Nomenclature

Some regions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing the terms such as "aborting," "accepting," "accessing," "adding," "adjusting," "analyzing," "applying," "assembling," "assigning," "balancing," "blocking," "calculating," "capturing," "combining," "comparing," "collecting." "configuring," "creating," "debugging," "defining," "delivering," "depicting," "detecting," "determining," "displaying," "downloading," "establishing," "executing," "forwarding," "flipping," "generating," "grouping," "hiding," "identifying," "initiating," "instantiating," "interacting," "modifying," "monitoring," "moving," "outputting," "parsing," "performing," "placing," "presenting," "processing," "programming," "querying," "removing," "rendering," "repeating," "resuming," "sampling," "simulating," "sorting," "storing," "subtracting," "suspending," "tracking," "transcoding," "transforming," "unblocking," "using," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Native Application Used to Interact with Remotely-Executed Enterprise Applications Embodiments of the present invention enable a user to access enterprise data and interact with enterprise applications generating the enterprise data using a portable electronic device. More specifically, a native application (e.g., native enterprise application 211 of FIG. 2) for a portable electronic device (e.g., 110 of FIG. 1) enables a user of the portable electronic device to interact with one or more enterprise applications (e.g., enterprise applications 121-123 of FIG. 1). Each of the enterprise applications is executed remotely on a system (e.g., 120) in communication with the portable electronic device, where the portable electronic device may communicate data to the remote system (e.g., via interface 115) and display data received from the remote system (e.g., via interface 115). For example, user inputs (e.g., input using user interface component 220 of FIG. 2) related to the enterprise applications may be communicated to the remote system from the portable electronic device, while enterprise web content associated with initiation or execution of the enterprise application may be communicated to the portable electronic device for display thereon (e.g., using display device 230 of FIG. 2). In this manner, embodiments utilize processing resources and storage resources of the remote system (e.g., 120) to execute the enterprise application (e.g., 121, 122, 123, etc.), thereby enabling a user to initiate or interact with a computationally-intensive enterprise application (e.g., 121, 122, 123, etc.) using a portable electronic device (e.g., 110).

Figure 3:
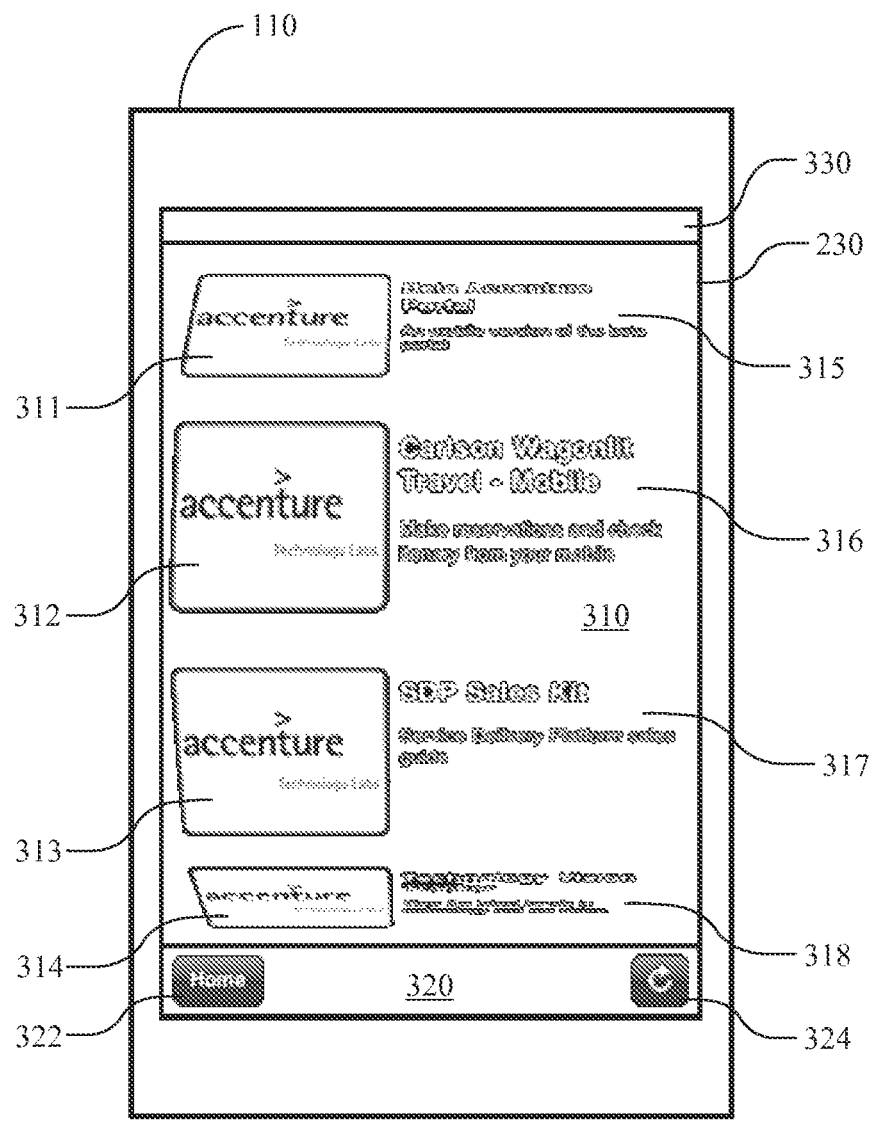
FIG. 3 shows a first exemplary graphical user interface of an exemplary display device in accordance with one embodiment of the present invention.
Figure 4:
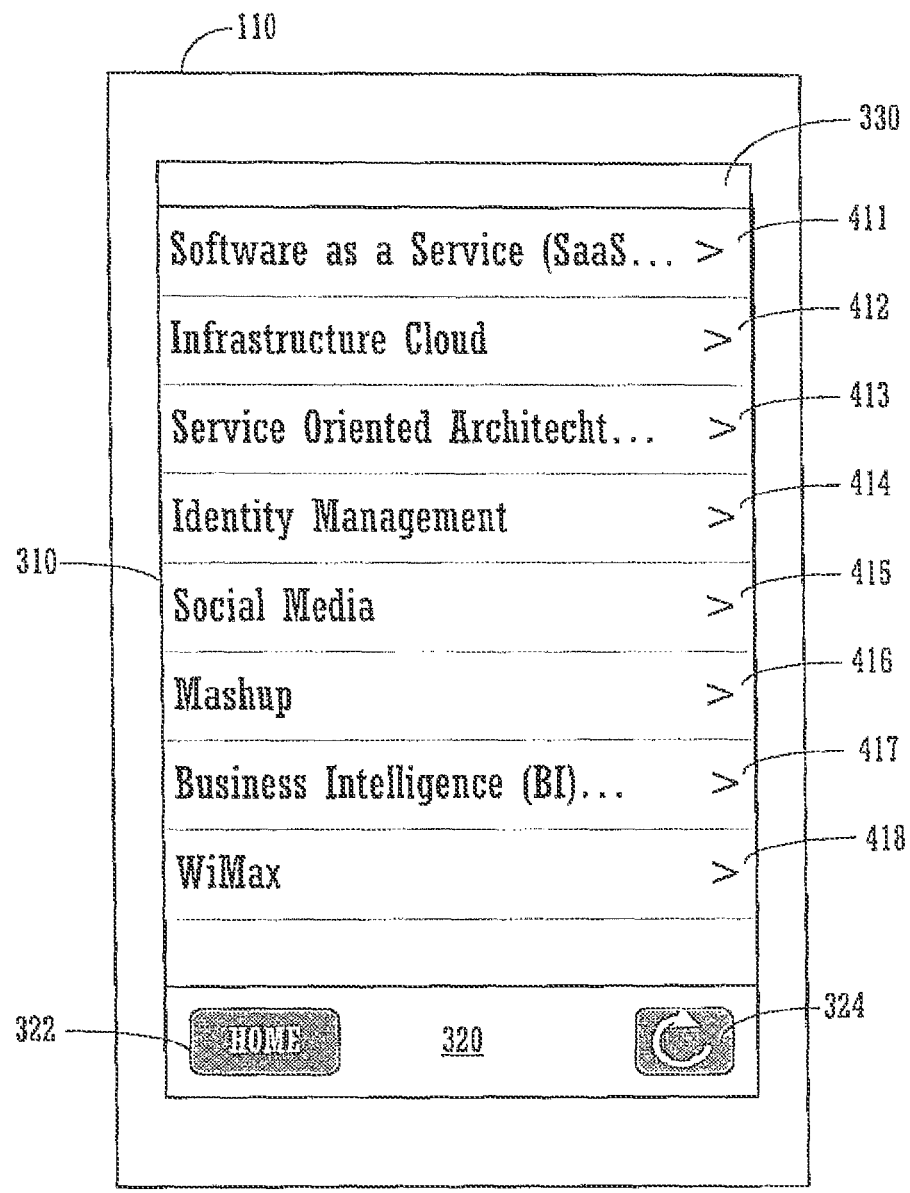
FIG. 4 shows a second exemplary graphical user interface of an exemplary display device in accordance with one embodiment of the present invention.

The native enterprise application (e.g., 211) may generate a graphical user interface (e.g., as shown in FIGS. 3 and 4) for enabling a user to initiate remote execution of an enterprise application and/or interact with one or more enterprise applications being executed on a remote system. For example, enterprise web content associated with a list of enterprise applications for execution may be communicated to the portable electronic device from the remote system. The enterprise web content may be rendered by the portable electronic device (e.g., using a web browser engine of the portable electronic device) to display a list of enterprise applications for selection by a user. The graphical user interface displaying the enterprise applications may have a "look and feel" similar to that of other native applications executable by the portable electronic device. In response to a user selecting an enterprise application from the list of enterprise applications displayed on the portable electronic device, data may be sent from the portable electronic device to a remote system for initiating execution of the enterprise application on the remote system.

During execution of the one or more enterprise applications (e.g., 121, 122, 123, etc.) on the remote system (e.g., 120), enterprise data may be accessed from a component of an enterprise backend (e.g., enterprise information database 131, legacy system 132, database server 133, email server 134, etc.). The enterprise applications (e.g., 121, 122, 123, etc.) may share data with one another, where the shared data may be stored on a memory of the portable electronic device (e.g., 110), a memory of the remote system (e.g., 120), on a memory of another system (e.g., communicatively coupled to the device 110 and/or the system 120), etc. The remote system (e.g., 120) may process the enterprise data and generate enterprise content (e.g., output from the enterprise applications). The enterprise content may be transformed (e.g., by transformation component 126) into enterprise web content (e.g., having a format such as XML, JAVA, CSS, http, https, etc.) for rendering by and/or display on a portable electronic device (e.g., using a web browser engine of the portable electronic device). In this manner, user inputs to the portable electronic device (e.g., 110) from a user viewing the displayed enterprise web content may be communicated to the remote system (e.g., 120) for enabling a user to interact with the one or more enterprise applications executed by the remote system (e.g., 120).

FIG. 1 shows exemplary system 100 for providing access to enterprise data on a portable electronic device in accordance with one embodiment of the present invention. As shown in FIG. 1, portable electronic device 110 is disposed remotely from and communicatively coupled to system 120 via interface 115, while system 120 is communicatively coupled to enterprise backend 130 via interface 125. User inputs from portable electronic device 110 may be communicated to system 120, where the user inputs may be related to initiating execution of an enterprise application (e.g., 121, 122, 123, etc.) on system 120, interacting with one or more enterprise applications executing on system 120, etc. Additionally, enterprise web content may be communicated from system 120 to portable electronic device 110 for display thereon, where the enterprise web content may be used to display a listing of enterprise applications (e.g., selectable by a user of portable electronic device 110) for execution on system 120, to display updated data related to execution of an enterprise application on system 120 (e.g., generated in response to a user input to portable electronic device 110), etc. Accordingly, embodiments of the present invention may utilize processing and storage resources of a remote system (e.g., 120) for enabling a user to interact with an enterprise application (e.g., executed on remote system 120) and access enterprise data (e.g., accessed during execution of the enterprise application and communicated to the portable electronic device as enterprise web content for rendering thereon) using a portable electronic device (e.g., 110).

As shown in FIG. 1, enterprise backend 130 may provide access to a variety of enterprise data. Enterprise data may be any information related to a business. For example, enterprise information database 131 may store public information about a business (e.g., name, location, name of officers, information about competitors of a given business, etc.) and/or private information about a business (e.g., information about internal operations of the business, information collected from employees or contractors of the business, information related to client interactions, information related to interaction with suppliers or other business partners, etc.). In one embodiment, database 131 may be a SAP database, ORACLE database, ERP database, CRM database, PLM database, SCM database, SRM database, or another database storing enterprise data. Enterprise backend 130 may also provide access to enterprise systems (e.g., legacy system 132, database server 133, email server 134) which may in turn provide access to other enterprise data. As such, a user of device 110 may access a variety of enterprise data.

System 120 may execute one or more of enterprise applications 121-123 using enterprise application processing component 125, where the one or more enterprise applications may be executed sequentially and/or contemporaneously. The one or more enterprise applications being executed on system 120 may access and/or process enterprise data (e.g., communicated from enterprise backend 130). For example, raw enterprise data (e.g., in the form of numbers, words, etc.) may be accessed and processed using one or more enterprise applications to generate enterprise content (e.g., processed enterprise data including charts, graphs or other information derived from the raw enterprise data).

The enterprise content (e.g., output from one or more of enterprise applications 121-123) may be used to generate enterprise web content using enterprise data transformation component 126. For example, enterprise content may be accessed in a first format directly from processing component 125, from memory 124, etc. Enterprise web content may be generated by component 126 based upon the enterprise data, where the enterprise web content is in a second format for rendering by and/or display on device 110. For example, the enterprise web content may be associated with a format such as XML, JAVA, CSS, http, https, or another format which may be accessed and/or parsed by device 110.

System 120 also includes intra-enterprise application integration component 127 for enabling a plurality of enterprise applications to share data or otherwise function together. For example, a first enterprise application (e.g., 121) may access enterprise data (e.g., raw enterprise data accessed from backend 130) and/or enterprise content generated or accessed by a second enterprise application (e.g., 122) using component 127. The enterprise content or enterprise data may be accessed from a memory of system 120 (e.g., memory 124), a memory of device 110 (e.g., memory 240 of FIG. 2), or another memory accessible by one or more components of system 100. In this manner, component 127 may coordinate operation of a plurality of enterprise applications (e.g., 121, 122, 123, etc.) to enable a user of device 110 to access additional, richer, more complex or otherwise different enterprise data. Additionally, it should be appreciated that the data sharing between multiple enterprise applications may be implemented even where the device 110 may restrict and/or prohibit data sharing between native applications executed on the portable electronic device, and thus, a user of device 110 may initiate and/or interact with one or more enterprise applications which share data with one another.

Memory 124 may be used to store enterprise data, enterprise content, enterprise web content, or some combination thereof. For example, enterprise data may be stored in memory 124 and accessed in portions for processing by processing component 125. Memory 124 may store enterprise content for access and processing by component 126. As a further example, the enterprise content and/or enterprise web content may be formatted or partitioned to fit the display screen of portable electronic device 120, and thus, memory 124 may store portions of the enterprise content or enterprise web content to be subsequently communicated to device 110 for display thereon (e.g., in response to a user scrolling through information presented on device 110, in response to another user input to device 110, etc.).

System 120 may be implemented by a web server in one embodiment. Alternatively, system 120 may be an ERP server, CRM server, etc. And in other embodiments, system 120 may be another type of computer system and/or server.

As shown in FIG. 1, interface 115 and/or interface 125 may be a wired interface and/or a wireless interface. For example, data may be communicated over interface 115 and/or interface 125 in accordance with a wireless standard such as WIMAX, WLAN, WPAN, WMAN, etc. Interface 115 and/or interface 125 may comprise a GSM network, GPRS network, UMTS network, or the like. And in one embodiment, interface 115 and/or interface 125 may comprise a wired network such as a local area network (LAN), wide-area network (WAN), etc.

In one embodiment, interface 115 and/or interface 125 may include at least one insecure portion or reduced-security portion. For example, interface 115 and/or interface 125 may include the Internet, one or more demilitarized zones (DMZs), one or more proxy servers, etc. Accordingly, one or more trusted connections may be established between components of system 100 (e.g., device 110, system 120, enterprise backend 130, etc.) to more securely transfer data (e.g., enterprise data, enterprise content, enterprise web content, etc.). In one embodiment, a trusted connection between device 110 and system 120 (e.g., utilizing interface 115) may be established in accordance with security policies stored in device management database 128 of system 120, where the security policies are specific to device 110, a group of devices including device 110, etc. The security policies may be established by an enterprise information technology (IT) department and/or chief information officer (CIO) in one embodiment.

In another embodiment, a virtual private network (VPN) may be created for more securely transferring data between device 110 and system 120 using public networks, where the VPN is established using a portion of the native enterprise application running on device 110. The native enterprise application may also implement authentication procedures (e.g., to authenticate device 110 and/or system 120 before communicating sensitive data) and/or encryption procedures (e.g., encryption, decryption, etc.) with system 120 to further increase the security of data communicated between device 110 and system 120. Further, in one embodiment, the native enterprise application running on device 110 may utilize soft tokens or other security mechanisms to increase the security of data communicated between device 110 and system 120.

As shown in FIG. 1, system 120 also includes provisioning database 129. Database 129 may store information used to determine which enterprise applications (e.g., 121, 122, 123, etc.) a user of device 110 may initiate and/or interact with. For example, information stored in database 129 may be used to determine that a user of device 110 may initiate and/or interact with enterprise applications 121 and 122 (e.g., and not enterprise application 123), while information stored in database 129 may be used to determine that a user of another portable electronic device (e.g., communicatively coupled to system 120) may initiate and/or interact with enterprise applications 121 and 123 (e.g., and not enterprise application 122). In this manner, embodiments enable a privilege level to be assigned to one device (e.g., 110), thereby creating a one-to-one relationship between a user and the device (e.g., 110) to enable only that user to authenticate and access enterprise data using the device (e.g., 110). Alternatively, embodiments enable a privilege level to be assigned to a group of devices (e.g., including device 110 and other devices).

In one embodiment, the privilege level assigned to device 110 may be determined during an authentication procedure implemented by the native enterprise application running on device 110. For example, a user may input login information (e.g., username, password, etc.), where the login information may be used to determine information about the user used to determine the privilege level assigned to device 110. For example, if it is determined that the user is an owner of a business as opposed to a lower-level employee of the business, device 110 may enable the user to interact with a larger number of enterprise applications. In one embodiment, the listing of enterprise applications displayed on device 110 for selection by the owner may be more extensive than a similar listing of enterprise applications displayed on another portable electronic device of the lower-level employee, thereby enabling a user to initiate and/or interact with only those enterprise applications associated with the privilege level of the device. Additionally, the privilege level assigned to device 110 may be stored in provisioning database 129 of system 120, a memory of device 110 (e.g., memory 240 of FIG. 2), etc. Further, the login information and/or information about a user may be communicated over the Internet (e.g., as part of interface 115), and therefore, the authentication procedure may be web-based in one embodiment.

Figure 2:
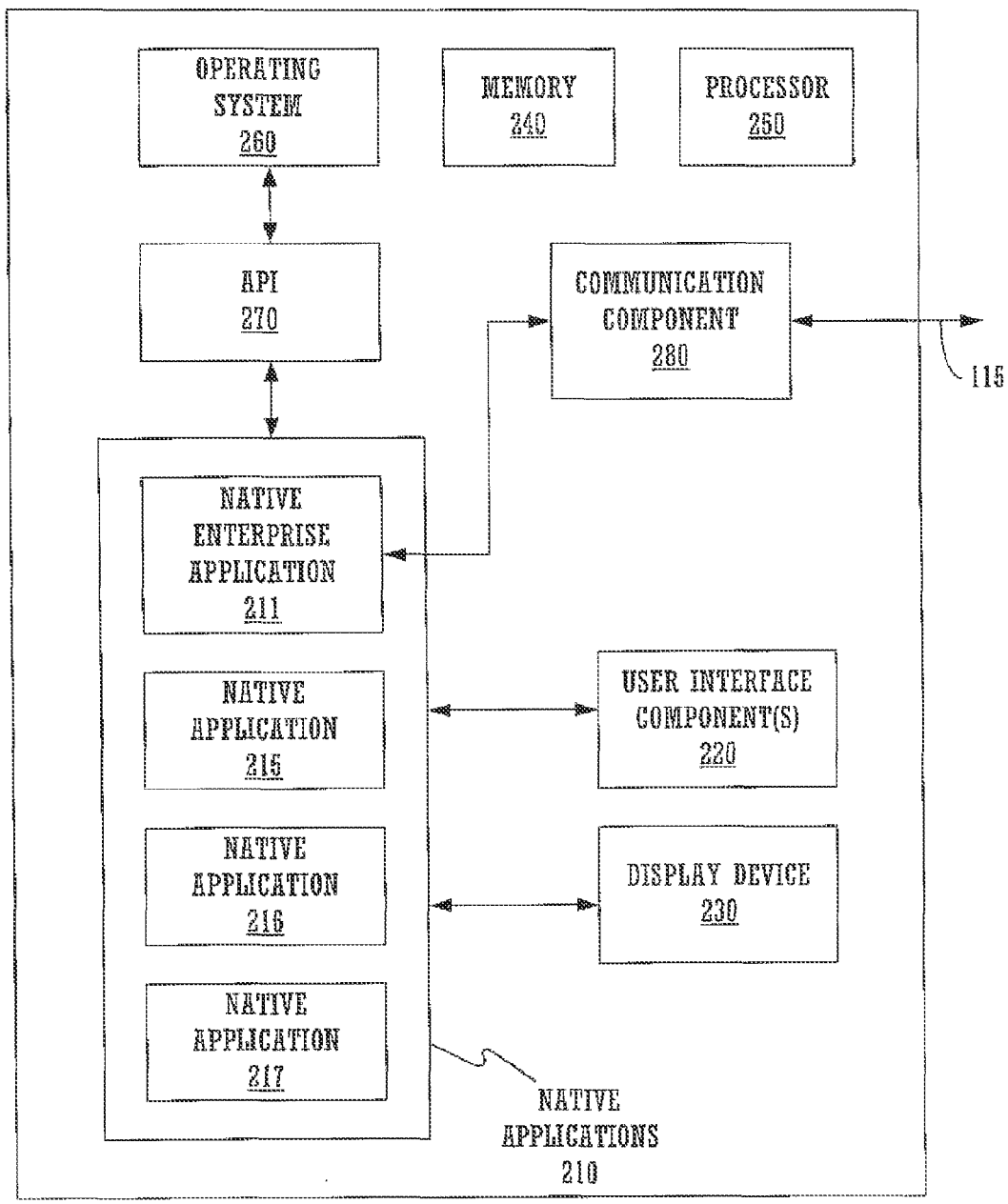
FIG. 2 shows an exemplary portable electronic device in accordance with one embodiment of the present invention.

Provisioning database 129 may also be used to implement one or more security measures to protect data on device 110 and/or to protect data accessed by device 110 using the native enterprise application (e.g., 211 of FIG. 2). For example, if it is determined that device 110 is lost, stolen, or otherwise in the hands of an unauthorized user, the data in provisioning database 129 may be updated to adjust the privilege level of the device such that device 110 has reduced or no access to enterprise data or other data from system 120. In this manner, memory (e.g., 240) or other components of the device 110 may be remotely locked or deleted (e.g., wiped) to make data (e.g., enterprise data) stored on device 110 inaccessible to an unauthorized user of the device (e.g., 110). And in one embodiment, if it is determined that device 110 is lost, stolen, or otherwise in the hands of an unauthorized user, the native enterprise application (e.g., 211 of FIG. 2) or other components of device 110 may cause data stored on device 110 (e.g., associated with enterprise data or other data from system 120) to be deleted (e.g., wiped) or otherwise rendered inaccessible (e.g., locked) in response to commands from system 120. It should be appreciated that the data (e.g., enterprise data) may be made inaccessible (e.g., by deleting, wiping, locking, etc.) to an unauthorized user of the device (e.g., 110) without affecting the execution of other applications (e.g., native applications 215, 216, 217, etc.) on the device (e.g., 110) in one embodiment.

As shown in FIG. 1, device application server 140 is coupled to device 110. Device application server 140 stores applications (e.g., native applications) for download and execution by device 110. In one embodiment, the native enterprise application run on device 110 (e.g., for enabling device 110 to provide access to enterprise data and/or enable user interaction with one or more enterprise applications) may be downloaded from server 140 via interface 116.

System 100 may also include computer system 150 coupled to device 110 via interface 117. Computer system 150 may be a personal computer system of the user of device 110, where system 150 is used to communicate data with device 110. For example, a user may synchronize data on device 110 with data stored on or accessed by system 150.

In one embodiment, interface 116 and/or 117 may be a wired interface and/or a wireless interface. For example, data may be communicated over interface 116 and/or interface 117 in accordance with a wireless standard such as WIMAX, WLAN, WPAN, WMAN, etc. Interface 116 and/or interface 117 may comprise a GSM network, GPRS network, UMTS network, or the like. In one embodiment, data may be communicated over interface 116 and/or interface 117 in accordance with a wired standard such as USB1.1, USB 2.0, FIREWIRE, PCI-EXPRESS, SATA, etc. And in one embodiment, interface 116 and/or interface 117 may comprise a wired network such as a local area network (LAN), wide-area network (WAN), etc.

Although FIG. 1 shows system 100 with a specific number and arrangement of components (e.g., 110, 120, 130, 140 and 150), it should be appreciated that system 100 may include a different number and/or arrangement of components in other embodiments. For example, it should be appreciated that a plurality of portable electronic devices (e.g., similar to and/or including device 110) may be communicatively coupled to system 120 in other embodiments. Additionally, although FIG. 1 shows each component of system 100 with a specific number and arrangement of sub-components (e.g., 131-134 of enterprise backend 130, 121-129 of system 120, etc.), it should be appreciated that one or more of the components of system 100 may include a different number or arrangement of sub-components in other embodiments.

FIG. 2 shows exemplary portable electronic device 110 in accordance with one embodiment of the present invention. Device 110 may be a mobile phone, a personal digital assistant, a media player (e.g., image viewer, movie viewer, music player, etc.), or the like. In other embodiments, device 110 may be any device which may be transported by a user.

As shown in FIG. 2, device 110 includes a plurality of native applications 210 which are stored locally in a memory of device 110 (e.g., memory 240) and executed by a processor (e.g., 250) of device 110. Native applications 210 may include native enterprise application 211, native application 215, native application 216, and native application 217. Native applications 215-217 may be calendar applications, email applications, games, or other applications associated with non-enterprise data. In one embodiment, native enterprise application 211 may enable a user to interact with enterprise applications (e.g., 121, 122, 123, etc.) and provide access to enterprise data. Additionally, in one embodiment, device 110 may restrict (e.g., limit, prohibit, etc.) communications and/or data sharing between applications 210 (e.g., native enterprise application 211, native application 215, native application 216, native application 217, some combination thereof, etc.).

Each of native applications 210 may cause user inputs from user interface components 220 to be accessed, and each of native applications 210 may cause data to be displayed on display device 230. Additionally, device includes operating system 260 which communicates with native applications 210 via application programming interface (API) 270. In one embodiment, API 270 may be provided as part of a software development kit (SDK) for enabling software developers to create native applications and/or enable the native applications to run on device 110.

Device 110 also includes communication component 280. In one embodiment, component 280 may include a web browser engine operable to access, parse or otherwise process web content. The web browser engine may be provided or otherwise implemented using an SDK (e.g., from the manufacturer of device 110). Accordingly, native enterprise application 211 may cause enterprise web content (e.g., generated by component 126 and communicated to device 110) to be displayed (e.g., on display device 230) using component 280 to read or prepare the enterprise web content for display. As such, in one embodiment, native enterprise application 211 may implement a container or mechanism for displaying the enterprise web content on device 110.

As shown in FIG. 2, user interface components 220 may include one or more mechanically-actuated user interface components (e.g., one or more physical keys of a keyboard) in one embodiment. In one embodiment, user interface components 220 may include a touchscreen (e.g., disposed over display device 230), where the touchscreen may enable selection of or interaction with regions of display screen 230. For example, a user may select a graphical button displayed on display screen 230 by interaction with a region of the touchscreen implemented by user interface components 220 which overlaps or otherwise corresponds to the graphical button. As a further example, a user may make gestures in proximity to or in contact with the touchscreen implemented by user interface components 220 to enable navigation through menus, to alter the display of the information on display screen 230 (e.g., to zoom, pan, etc.), or the like.

In one embodiment, user interface components 220 may include an audio input device such as a microphone. Alternatively, user interface components 220 may include a visual input device such as an optical sensor.

Display device 230 may be any type of display for displaying information to a user. For example, display 230 may be a liquid crystal display (LCD), field effect transistor (FET) display, light emitting diode (LED) display, organic light emitting diode (OLED) display, cathode ray tube (CRT) display, etc.

As discussed herein with respect to FIG. 1, native enterprise application 211 may increase the security of data (e.g., enterprise data, enterprise content, enterprise web content, etc.) by implementing a VPN between device 110 and system 120, authentication procedures for device 110 and/or system 120, encryption/decryption procedures for the data, or the like. Native enterprise application 211 may also increase the security of data (e.g., enterprise data, enterprise content, enterprise web content, etc.) by using soft tokens or other security mechanism for increasing the security of data.

Native enterprise application 211 may also enable data to be synchronized between device 110 and system 120. For example, if a user enters data (e.g., text) into device 110, the data entered by the user may be communicated to system 120 for synchronization thereof. As another example, if a user alters the display of data on device 110, data representing the alteration may be communicated to system 120 for synchronizing the data stored by system 120. And as a further example, if data is updated or otherwise changed by system 120, then the change may be communicated to device 110 for updating the enterprise web content displayed thereon and synchronizing it with the data stored in system 120.

Additionally, native enterprise application 211 may enable data sharing between enterprise applications (e.g., 121, 122, 123, etc.) executed on system 120. In one embodiment, native enterprise application 211 may operate in conjunction with an intra-enterprise application integration component (e.g., 127) of system 120 to implement the data sharing. The shared data may include enterprise data, enterprise content, enterprise web content, or some combination thereof. The shared data may be stored in a memory of device 110 (e.g., memory 240), a memory of system 120 (e.g., memory 124), etc. Accordingly, in one embodiment, data may be shared between enterprise applications even where device 110 does not permit data sharing between native applications 210 and/or does not permit contemporaneous execution of two or more of native applications 210.

In one embodiment, native enterprise application 211 may enable data sharing between applications 210 of device 110. For example, native enterprise application 211 may store data in a memory (e.g., 240 of device 110, a memory of system 120, etc.) for access by at least one native application (e.g., 215, 216, 217, etc.) during execution. Alternatively, during execution of native enterprise application 211, native enterprise application 211 may access data stored in a memory (e.g., 240 of device 110, a memory of system 120, etc.) by at least one native application (e.g., 215, 216, 217, etc.). In this manner, embodiments enable the sharing of data between applications 210 even in cases where the applications sharing data are not executed simultaneously.

Additionally, the user experience (e.g., the "look and feel" of the GUI for presenting enterprise web content) associated with native enterprise application 211 may be consistent with that of other native applications (e.g., 215-217) of device 110. For example, a GUI associated with the native enterprise application (e.g., a GUI as shown in FIG. 3 and/or FIG. 4) may be displayed on display device 230, where display device 230 is also used during execution of other native applications (e.g., 215-217) to display content. Additionally, the user interface elements (e.g., buttons, icons, images, text, menu elements, etc.) displayed during execution of native enterprise application 211 (e.g., one or more of enterprise user interface elements 311-318 of FIG. 3, one or more of native user interface elements 322 or 324 of FIG. 3, etc.) may be similar in appearance to the user interface elements generated by other native applications (e.g., 215-217). Further, the effect of certain commands or user inputs (e.g., specific finger movements or gestures, etc.) on the GUI associated with native enterprise application 211 may be similar to the effect that the same commands or user inputs have on a GUI associated with one or more of the other native applications (e.g., 215-217).

FIG. 3 shows a first exemplary graphical user interface of exemplary display device 110 in accordance with one embodiment of the present invention. As shown in FIG. 3, display screen 230 of device 110 displays a GUI with three regions (e.g., 310, 320 and 330). Region 310 is operable to display enterprise web content (e.g., communicated from system 120 to device 110) and includes enterprise user interface elements 311-318 generated by the native enterprise application (e.g., 211). Region 320 includes native user interface elements 322 and 324. Additionally, region 330 is operable to display other information (e.g., wireless signal strength associated with interface 115, the name of the wireless carrier providing the wireless service to implement interface 115, the current time, a battery level of device 110, etc.).

In one embodiment, enterprise user interface elements 311-318 may form a menu and correspond to enterprise applications (e.g., 121, 122, 123, some combination thereof, etc.) for selection by a user of device 110. In one embodiment, elements 311-314 may be icons corresponding to respective enterprise applications (e.g., 121, 122, 123, etc.), while elements 315-318 may be text descriptions corresponding to the respective enterprise applications (e.g., 121, 122, 123, some combination thereof, etc.). For example, interaction with element 311 and/or element 315 may initiate execution of enterprise application 121 on system 120, interaction with element 312 and/or element 316 may initiate execution of enterprise application 122 on system 120, and so on. Alternatively, interaction with elements 311-318 may cause a new menu (e.g., with different enterprise graphical user elements) to be displayed in region 310, where the new menu may be a sub-menu associated with a selected enterprise user interface element (e.g., 311-318).

As shown in FIG. 3, elements 311-318 may be arranged in a ring which may rotate to change the displayed user interface elements. For example, a first user interaction (e.g., a downward swipe of a finger, another gesture, another user interaction, etc.) with display screen 230 and/or a touch screen disposed thereon (e.g., as part of user interface components 220) may cause the ring to move downward. In this manner, elements 311-313 and elements 315-317 would shift downward to make room for the display of new user interface elements (e.g., displayed in the position occupied by elements 311 and 315 as depicted in FIG. 3) associated with a different enterprise application (e.g., executable by system 120). As a further example, a second user interaction (e.g., an upward swipe of a finger, another gesture, another user interaction, etc.) with display screen 230 and/or a touch screen disposed thereon (e.g., as part of user interface components 220) may cause the ring to move upward. In this manner, elements 312-314 and elements 316-318 would shift upward to make room for the display of new user interface elements (e.g., displayed in the position occupied by elements 314 and 318 as depicted in FIG. 3) associated with a different enterprise application (e.g., executable by system 120). Accordingly, embodiments provide convenient mechanisms for using a portable electronic device (e.g., 110) to enable selection of one or more enterprise applications for execution on a system (e.g., 120) disposed remotely from the portable electronic device (e.g., 110).

In one embodiment, enterprise user interface elements 311-318 may be associated with enterprise content generated during execution of an enterprise application (e.g., 121, 122, 123, etc.) and/or enterprise data (e.g., accessed from enterprise backend 130 during execution of the enterprise application). For example, elements 311-318 may be displayed on display 230 after initiating execution of an enterprise application on system 120. Enterprise content may be generated by system 120 during execution of an enterprise application (e.g., 121, 122, 123, etc.), where the enterprise content is associated with enterprise data (e.g., is a chart, graph, etc. generated based upon the enterprise data, is a reformatted version of text, numbers or other enterprise data, etc.) accessed from enterprise backend 130 during execution of the enterprise application. Enterprise web content may be generated based upon the enterprise content (e.g., by processing component 125, transformation component 126, etc.), where the enterprise web content may be communicated to device 110 for displaying elements 311-318. The enterprise web content may be displayed on device 110 by a native enterprise application (e.g., 211) in conjunction with a communication component of device 110 (e.g., 280) used to parse or otherwise process the enterprise web content for display. In this manner, embodiments provide convenient mechanisms for using a portable electronic device (e.g., 110) to enable selection of one or more enterprise applications for execution on a system (e.g., 120) disposed remotely from the portable electronic device (e.g., 110).

As shown in FIG. 3, native user interface elements 322 and 324 may be used to interact with enterprise web content displayed in region 310 by the native enterprise application (e.g., 211). For example, element 322 may be a "home button" for returning a user to return to a "home" screen associated with the native enterprise application (e.g., 211). In one embodiment, a "home" screen associated with execution of a native enterprise application (e.g., 211) may be a menu for selecting enterprise applications for execution, where the menu is displayed in region 310 in response to an interaction with element 322. Additionally, the "home" screen associated with execution of a native enterprise application (e.g., 211) may be displayed in response to an interaction with element 322 without leaving and/or interrupting execution of the native enterprise application (e.g., 211) in one embodiment.

As another example, element 324 may be a "back button" for recalling the display of previously-displayed data associated with the native enterprise application (e.g., 211). In one embodiment, interaction with element 324 may initiate display of previously-displayed enterprise web content (e.g., enterprise web content associated with enterprise content generated during execution of a enterprise application, enterprise web content associated with a menu for selecting enterprise applications for execution, etc.) in region 310. In one embodiment, a program portion of the native enterprise application (e.g., 211) may include code and/or logic for tracking navigation through a menu hierarchy or other data of the enterprise web content, thereby enabling the native enterprise application (e.g., 211) to recall the previously-displayed enterprise web content (e.g., in response to a user interaction with element 324).

The native user interface elements (e.g., 322, 324, etc.) may be generated by the native enterprise application (e.g., 211). Additionally, in one embodiment, the native user interface elements (e.g., 322, 324, etc.) may be specific to (e.g., exclusively used by, exclusively accessed by, etc.) the native enterprise application (e.g., 211), and therefore, not used or accessed by other native applications (e.g., one or more of native applications 210).

Although FIG. 3 shows a specific number and arrangement of graphical user interface elements (e.g., 311-318, 322, 324, etc.), it should be appreciated that a different number and/or arrangement of graphical user interface elements may be used in other embodiments. Additionally, it should be appreciated that a different functionality may be attributed to one or more of the graphical user interface elements (e.g., 311-318, 322, 324, etc.) and/or a set of graphical user interface elements with different functionalities may be used in other embodiments. For example, native user interface elements 322 and/or 324 may be assigned different functionalities. Alternatively, additional and/or different native user interface elements may be displayed (e.g., in region 320), where the additional and/or different native user interface elements may be associated with different functionality than elements 322 and 324.

FIG. 4 shows a second exemplary graphical user interface for exemplary display device 110 in accordance with one embodiment of the present invention. The graphical user interface depicted in FIG. 4 is similar to that depicted in FIG. 3, except that the GUI of FIG. 4 has different enterprise graphical user elements than that of FIG. 3. For example, region 310 as shown in FIG. 4 includes enterprise graphical user elements 411-418.

In one embodiment, elements 411-418 may form a list-based menu which may be scrolled by a user to display different user interface elements. For example, a first user interaction (e.g., a downward swipe of a finger, another gesture, another user interaction, etc.) with display screen 230 and/or a touch screen disposed thereon (e.g., as part of user interface components 220) may cause the list-based menu to scroll downward. In this manner, elements 411-417 would shift downward to make room for the display or new user interface elements (e.g., displayed in the position occupied by element 411 as depicted in FIG. 4). As a further example, a second user interaction (e.g., an upward swipe of a finger, another gesture, another user interaction, etc.) with display screen 230 and/or a touch screen disposed thereon (e.g., as part of user interface components 220) may cause the list-based menu to scroll upward. In this manner, elements 412-418 would shift upward to make room for the display of new user interface elements (e.g., displayed in the position occupied by element 418 as depicted in FIG. 4). Additionally, the newly-displayed user interface elements may correspond to a different enterprise application executed on the remote system (e.g., 120).

In one embodiment, enterprise user interface elements 411-418 may correspond to enterprise applications (e.g., 121, 122, 123, etc.) for selection by a user of device 110. For example, interaction with element 411 may initiate execution of enterprise application 121 on system 120, interaction with element 412 may initiate execution of enterprise application 122 on system 120, and so on. Alternatively, interaction with elements 411-418 may cause a new menu (e.g., with different enterprise graphical user elements) to be displayed in region 310, where the new menu may be a sub-menu associated with a selected enterprise user interface element (e.g., 411-418).

In one embodiment, enterprise user interface elements 411-418 may be associated with enterprise content generated during execution of an enterprise application (e.g., 121, 122, 123, etc.) and/or enterprise data (e.g., accessed from enterprise backend 130 during execution of the enterprise application). For example, elements 411-418 may be displayed on display 230 after initiating execution of an enterprise application on system 120. Enterprise content may be generated by system 120 during execution of an enterprise application (e.g., 121, 122, 123, etc.), where the enterprise content is associated with enterprise data (e.g., is a chart, graph, etc. generated based upon the enterprise data, is a reformatted version of text, numbers or other enterprise data, etc.) accessed from enterprise backend 130 during execution of the enterprise application. Enterprise web content may be generated based upon the enterprise content (e.g., by processing component 125, transformation component 126, etc.), where the enterprise web content may be communicated to device 110 for displaying elements 411-418. The enterprise web content may be displayed on device 110 by a native enterprise application (e.g., 211) in conjunction with a communication component of device 110 (e.g., 280) used to parse or otherwise process the enterprise web content for display. In this manner, embodiments provide convenient mechanisms for using a portable electronic device (e.g., 110) to enable selection of one or more enterprise applications for execution on a system (e.g., 120) disposed remotely from the portable electronic device (e.g., 110).

Although FIG. 4 shows a specific number and arrangement of graphical user interface elements (e.g., 411-418, 322, 324, etc.), it should be appreciated that a different number and/or arrangement of graphical user interface elements may be used in other embodiments. Additionally, it should be appreciated that a different functionality may be attributed to one or more of the graphical user interface elements (e.g., 411-418, 322, 324, etc.) and/or a set of graphical user interface elements with different functionalities may be used in other embodiments. For example, native user interface elements 322 and/or 324 may be assigned different functionalities. Alternatively, additional and/or different native user interface elements may be displayed (e.g., in region 320), where the additional and/or different native user interface elements may be associated with different functionality than elements 322 and 324.

Additionally, native user interface elements 322 and 324 may be user customizable in one embodiment. For example, a user of native enterprise application 211 may define the number and/or functionality of native user interface elements (e.g., similar to elements 322 and/or 324) used during execution of native enterprise application 211.

Further, enterprise user interface elements (e.g., elements 311-318 of FIG. 3, elements 411-418 of FIG. 4, etc.) may be user customizable in one embodiment. For example, a user of native enterprise application 211 may define the number and/or functionality of enterprise user interface elements (e.g., similar to elements 311-318 of FIG. 3, elements 411-418 of FIG. 4, etc.) used during execution of native enterprise application 211.

Figure 5:
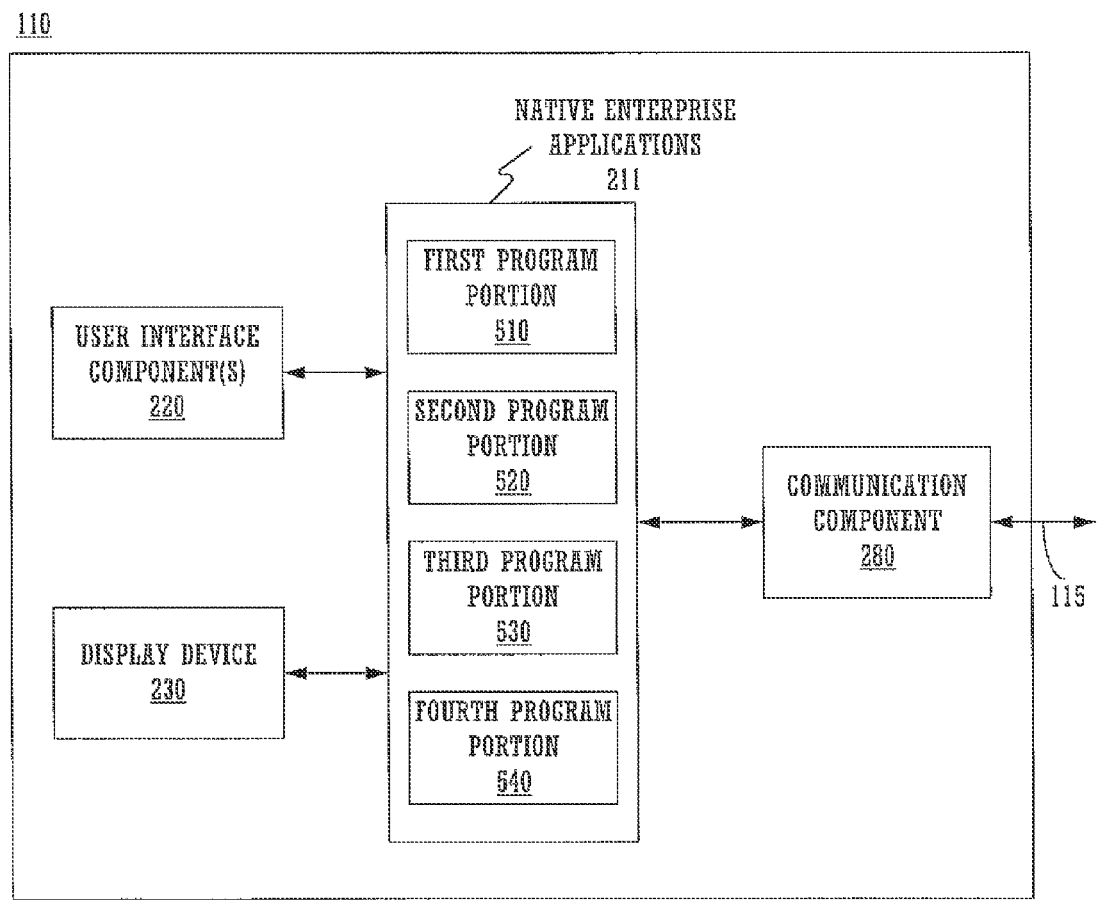
FIG. 5 shows an exemplary portable electronic device with a plurality of native enterprise application program portions in accordance with one embodiment of the present invention.

FIG. 5 shows exemplary portable electronic device 110 with a plurality of native enterprise application program portions in accordance with one embodiment of the present invention. As shown in FIG. 5, native enterprise application 211 includes first program portion 510, second program portion 520, third program portion 530 and fourth program portion 540. In one embodiment, each of program portions 510-540 may correspond to a different enterprise application (e.g., 121, 122, 123, etc.) executed by a remote system (e.g., 120) in one embodiment. For example, first program portion 510 may correspond to enterprise application 121 (e.g., by system 120), second program portion 520 may correspond to enterprise application 122 (e.g., by system 120), and so on.

In one embodiment, program portions 510-540 may be used to perform operations associated with an enterprise application or otherwise process data output during execution of the enterprise application. For example, program portions 510-540 may communicate data between interface components of device 110 (e.g., user interface components 220, display device 230, etc.) and communication component 280 during execution of a respective enterprise application on system 120. As a further example, data (e.g., enterprise data, enterprise content, enterprise web content, etc.) received over interface 115 from system 120 may be further processed by one or more of program portions 510-540 associated with the one or more enterprise applications being executed (e.g., by system 120) during generation of the data. In this manner, processing of the enterprise data and/or execution of the enterprise applications may be shared between the portable electronic device (e.g., 110) and the remote system (e.g., 120). In one embodiment, the amount of processing performed by each of device 110 and system 120 may be dynamically varied.

Although FIG. 5 shows native enterprise application with only four program portions (e.g., 510-540), it should be appreciated that native enterprise application 211 may include a smaller or larger number of program portions in other embodiments. Additionally, it should be appreciated that one or more of the program portions of native enterprise application 211 may be assigned responsibilities or functions different than those of program portions 510-540 in other embodiments. For example, one program portion of native enterprise application 211 may implement a dedicated interface layer for communicating with peripherals such as user interface components 220, display device 230, etc., while other program portions (e.g., 510, 520, 530, 540, etc.) may be responsible for processing data associated with initiation and/or execution of enterprise applications (e.g., 121, 122, 123, etc.).

Figure 6A:
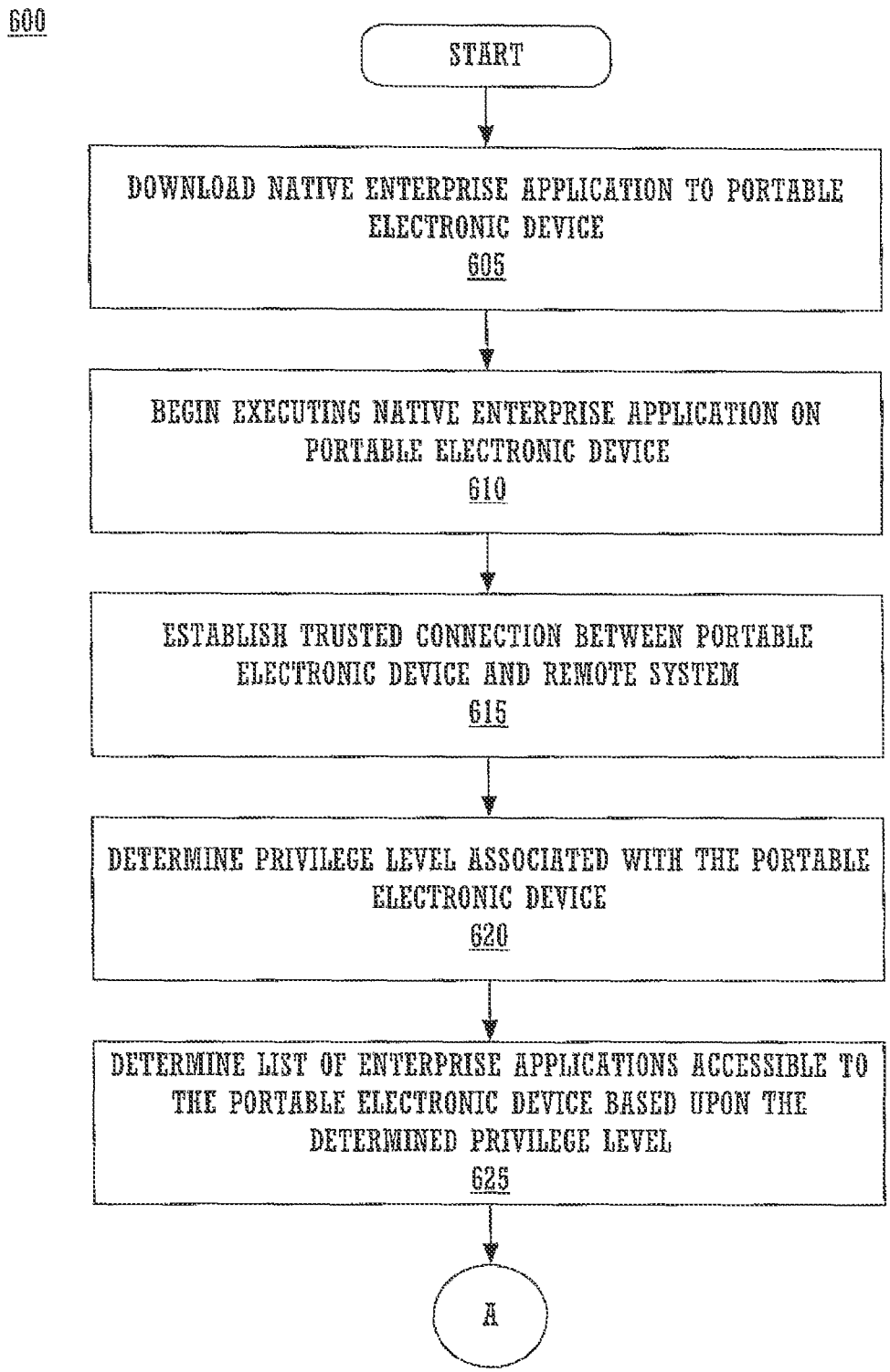
FIG. 6A shows a first portion of a flowchart of an exemplary computer-implemented process for enabling a user to interact with an enterprise application and access enterprise data in accordance with one embodiment of the present invention.

FIGS. 6A, 6B, 6C and 6D show a flowchart of exemplary computer-implemented process 600 for enabling a user to interact with an enterprise application and access enterprise data in accordance with one embodiment of the present invention. As shown in FIG. 6A, step 605 involves downloading a native enterprise application (e.g., 211) to a portable electronic device (e.g., 110). The native enterprise application may be downloaded from a device application server (e.g., 140) in one embodiment.

Step 610 involves beginning execution of the native enterprise application on the portable electronic device. The native enterprise application (e.g., 211) may be executed by a processor (e.g., 250) of the portable electronic device.

As shown in FIG. 6A, step 615 involves establishing a trusted connection between the portable electronic device (e.g., 110) and the remote system (e.g., 120). In one embodiment, the trusted connection may be established in accordance with security policies established by the native enterprise application (e.g., 211). Additionally, the trusted connection may enable sensitive data to be communicated over one or more public networks between the portable electronic device (e.g., 110) and the remote system (e.g., 120) with increased security.

Step 620 involves determining a privilege level associated with the portable electronic device. In one embodiment, the privilege level of the device (e.g., 110) may be determined by or otherwise associated with information about the user, where the user may be identified by login credentials submitted from the portable electronic device (e.g., 110) to the remote system (e.g., 120).

As shown in FIG. 6A, step 625 involves determining a list of enterprise applications accessible to the portable electronic device (e.g., 110) based upon the determined privilege level (e.g., determined in step 620). In one embodiment, a database (e.g., provisioning database 129) may be indexed (e.g., with a device identifier associated with device 110, a user identifier, privilege level data determined in step 620, some combination thereof, etc.) to determine a list of enterprise applications accessible to the portable electronic device (e.g., 110).

Figure 6B:
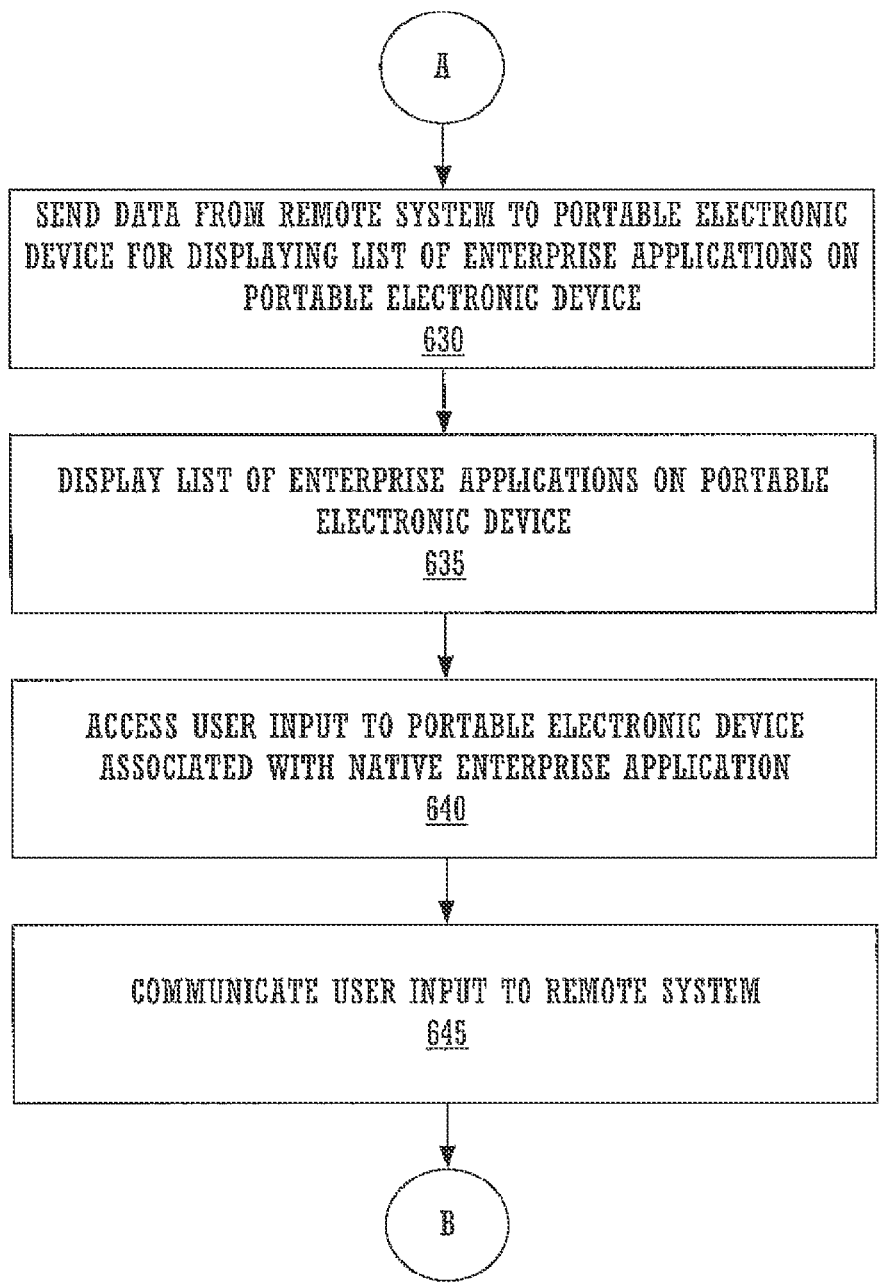
FIG. 6B shows a second portion of a flowchart of an exemplary computer-implemented process for enabling a user to interact with an enterprise application and access enterprise data in accordance with one embodiment of the present invention.

As shown in FIG. 6B, step 630 involves sending data (e.g., enterprise web content) from the remote system (e.g., 120) to the portable electronic device (e.g., 110) for displaying a list of enterprise applications (e.g., corresponding to the list determined in step 625) on the portable electronic device (e.g., 110). In one embodiment, enterprise web content may be generated based upon the list of enterprise applications determined in step 625, where the enterprise web content may be communicated in step 630 to the portable electronic device for rendering by and/or display thereon.

Step 635 involves displaying the list of enterprise applications on the portable electronic device (e.g., 110). In one embodiment, the list of enterprise applications may be displayed as a plurality of user interface elements arranged in a ring (e.g., as shown in FIG. 3), where each of the user interface elements may be selected by a user to initiate execution (e.g., on system 120) of an enterprise application associated with the selected user interface element. Alternatively, the list of enterprise applications may be displayed as a plurality of user interface elements arranged as a list-based menu (e.g., as shown in FIG. 4), where each of the user interface elements may be selected by a user to initiate execution (e.g., on system 120) of an enterprise application associated with the selected user interface element.

As shown in FIG. 6B, step 640 involves accessing a user input to the portable electronic device associated with the native enterprise application (e.g., 211). The user input may involve an interaction with at least one user interface component (e.g., 220) of the portable electronic device (e.g., 110). In one embodiment, the user input may be associated with updating the list of displayed enterprise applications (e.g., in response to a request to rotate the ring shown in FIG. 3, in response to a request to scroll the list based menu shown in FIG. 4, etc.). Alternatively, the user input may be associated with a selection of an enterprise application to be executed on a remote system (e.g., 120). And in one embodiment, the user input may be associated with performing processing associated with the user input to generate other enterprise content (e.g., during execution of an enterprise application by system 120).

Step 645 involves communicating the user input to the remote system (e.g., 120). The user input may be communicated over an interface (e.g., 115) coupling the portable electronic device (e.g., 110) to the remote system (e.g., 120).

Figure 6C:
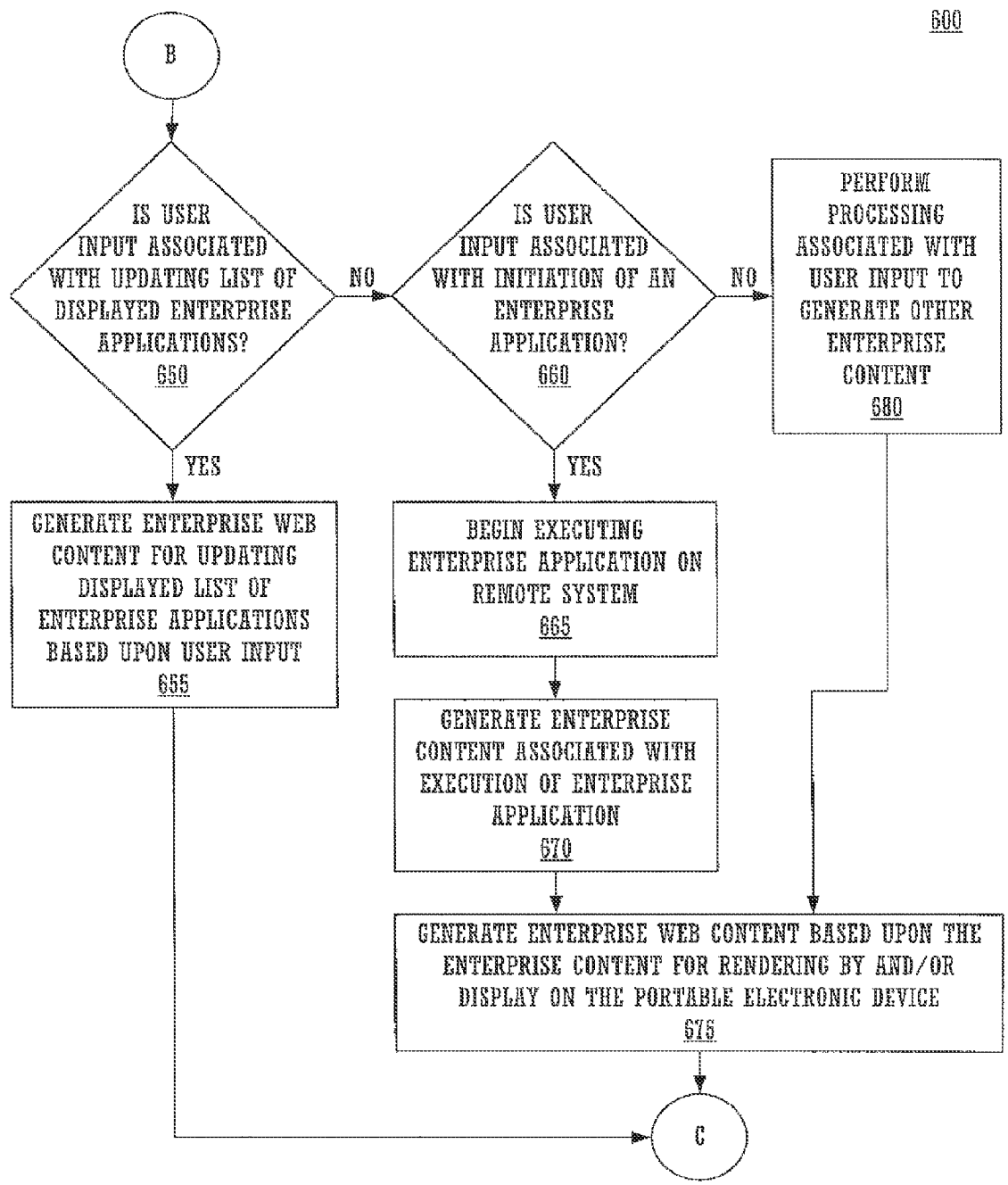
FIG. 6C shows a third portion of a flowchart of an exemplary computer-implemented process for enabling a user to interact with an enterprise application and access enterprise data in accordance with one embodiment of the present invention.

As shown in FIG. 6C, step 650 involves determining whether the user input is associated with updating the list of enterprise applications displayed on the portable electronic device. If it is determined in step 650 that the user input is associated with updating the list of enterprise applications displayed on the portable electronic device (e.g., in response to a request to rotate the ring shown in FIG. 3, in response to a request to scroll the list-based menu shown in FIG. 4, etc.), then enterprise web content for updating the displayed list of enterprise applications may be generated in step 655 before performing step 685 of FIG. 6D. The enterprise web content generated in step 655 may have a format different from that of the enterprise content, where the format of the enterprise web content may be XML, CSS, JAVA, http, https, etc. In one embodiment, if it is determined in step 650 that the user input is associated with updating the list of enterprise applications displayed on the portable electronic device and enterprise web content for displaying the updated list of enterprise applications is already stored on the portable electronic device, then the stored enterprise web content may be displayed on the portable electronic device (e.g., thereby skipping one or more of steps 655-690). Alternatively, if it is determined in step 650 that the user input is not associated with updating the list of enterprise applications displayed on the portable electronic device, then step 660 may be performed.

Step 660 involves determining whether the user input is associated with initiation of an enterprise application. If it is determined that the user input is associated with initiation of an enterprise application, then the enterprise application may begin executing on the remote system (e.g., 120) in step 665. Enterprise content associated with execution of the enterprise application may be generated in step 670. In step 675, enterprise web content may be generated (e.g., by transformation component 126) based upon the enterprise content for rendering by and/or display on the portable electronic device. The enterprise web content generated in step 675 may have a format different from that of the enterprise content, where the format of the enterprise web content may be XML, CSS, JAVA, http, https, etc. Alternatively, if it is determined in step 660 that the user input is not associated with initiation of an enterprise application, then step 680 may be performed.

As shown in FIG. 6C, step 680 involves performing processing associated with the user input to generate other enterprise content. For example, where the user input is associated with altering the display of enterprise data during execution of the enterprise application, then processing may be performed in step 680 to generate the other enterprise content using the enterprise application to enable the portable electronic device to correctly display the data associated with the user input. As a more specific example, if the user input is a request to display a certain portion of enterprise data on the portable electronic device, then processing may be performed in step 680 to generate enterprise content to enable the portable electronic device to display the portion of enterprise data. After performing step 680, enterprise web content may be generated (e.g., by transformation component 126) in step 675 based upon the other enterprise content (e.g., generated in step 680) for rendering by and/or display on the portable electronic device.

Figure 6D:
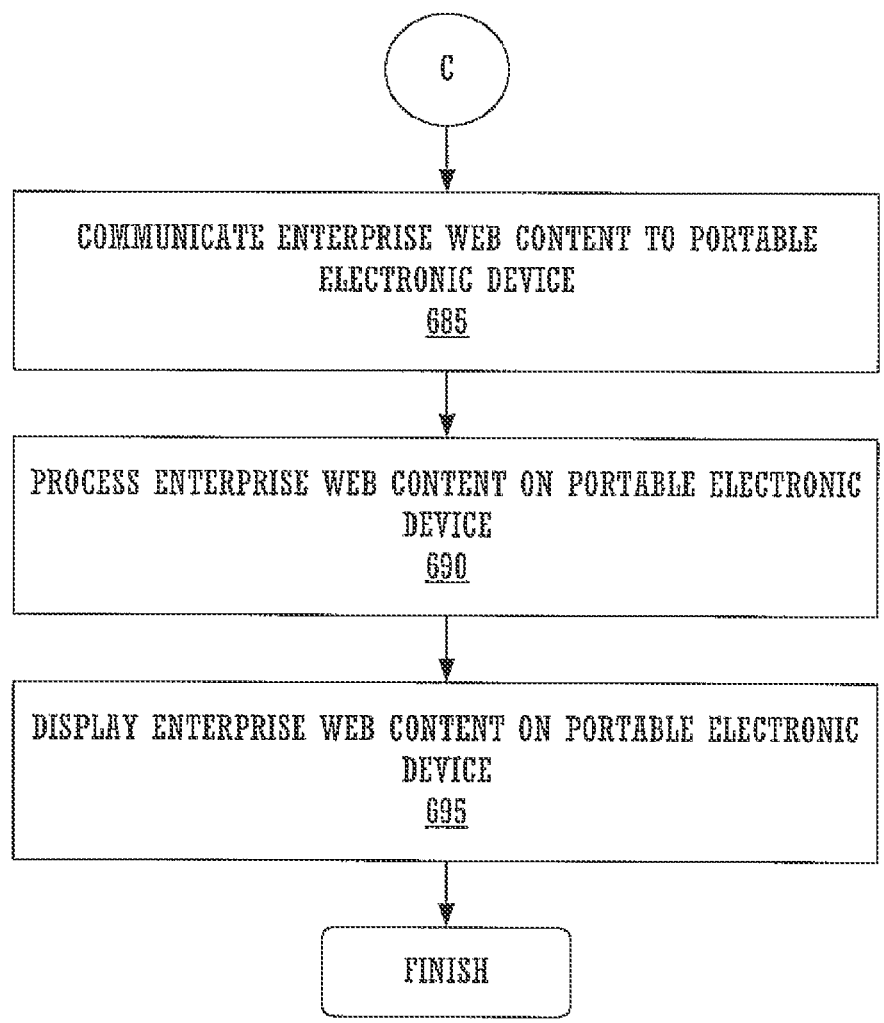
FIG. 6D shows a fourth portion of a flowchart of an exemplary computer-implemented process for enabling a user to interact with an enterprise application and access enterprise data in accordance with one embodiment of the present invention.

As shown in FIG. 6D, step 685 involves communicating the enterprise web content (e.g., generated in step 655 and/or step 675) to the portable electronic device. The enterprise web content may be communicated in step 685 over interface 115 in one embodiment.

Step 690 involves processing the enterprise web content on the portable electronic device. For example, the enterprise web content may be parsed by a communication component (e.g., 280) of the portable electronic device. Alternatively, additional processing may be performed on the data by a program portion (e.g., 510, 520, 530, 540, etc.) of the native enterprise application (e.g., 211), thereby sharing the processing of the enterprise data and/or sharing execution of the enterprise application with the remote system (e.g., 120).

As shown in FIG. 6D, step 695 involves displaying the enterprise web content on the portable electronic device. The enterprise web content may be displayed on a display device (e.g., 230) of the portable electronic device by the native enterprise application using a web browser engine of the portable electronic device in one embodiment. Additionally, in one embodiment, the enterprise web content may be displayed to form a graphical user interface as shown in FIG. 3, FIG. 4, or the like.

Figure 7:
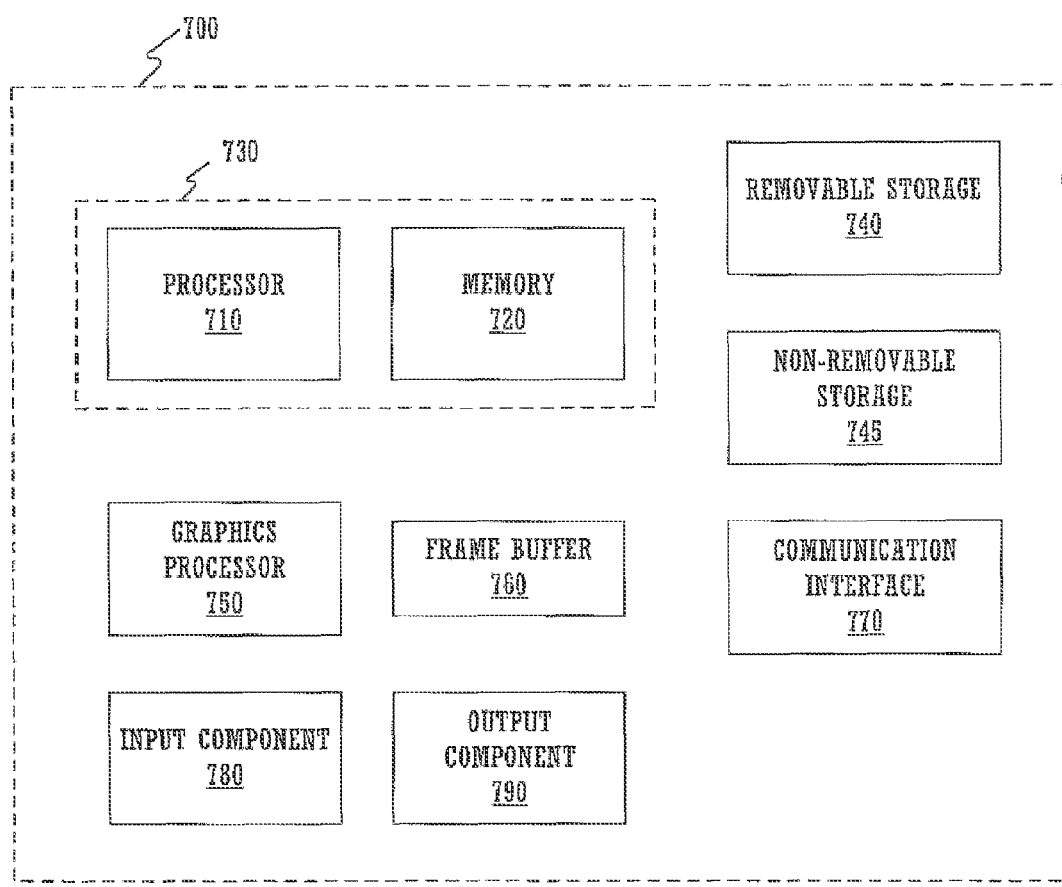
FIG. 7 shows an exemplary computer system platform upon which embodiments of the present invention may be implemented.

FIG. 7 shows exemplary general purpose computer system platform 700 upon which embodiments of the present invention may be implemented. For example, computer system 700 may be used to implement one or more components of device 110, system 120, enterprise backend 130, or some combination thereof.

As shown in FIG. 7, portions of the present invention are comprised of computer-readable and computer-executable instructions that reside, for example, in computer system platform 700 and which may be used as a part of a general purpose computer network (not shown). It is appreciated that computer system platform 700 of FIG. 7 is merely exemplary. As such, the present invention can operate within a number of different systems including, but not limited to, general-purpose computer systems, embedded computer systems, laptop computer systems, hand-held computer systems, portable computer systems, and stand-alone computer systems, for instance.

In one embodiment, depicted by dashed lines 730, computer system platform 700 may comprise at least one processor 710 and at least one memory 720. Processor 710 may comprise a central processing unit (CPU) or other type of processor. Depending on the configuration and/or type of computer system environment, memory 720 may comprise volatile memory (e.g., RAM), non-volatile memory (e.g., ROM, flash memory, etc.), or some combination of the two. Additionally, memory 720 may be removable, non-removable, etc.

In other embodiments, computer system platform 700 may comprise additional storage (e.g., removable storage 740, non-removable storage 745, etc.). Removable storage 740 and/or non-removable storage 745 may comprise volatile memory, non-volatile memory, or any combination thereof. Additionally, removable storage 740 and/or non-removable storage 745 may comprise CD-ROM, digital versatile disks (DVD) or other optical storage, magnetic cassettes, magnetic tape, magnetic disk storage or other magnetic storage devices, or any other medium which can be used to store information for access by computer system platform 700.

As shown in FIG. 7, computer system platform 700 may communicate with other systems, components, or devices via communication interface 770. Communication interface 770 may embody computer readable instructions, data structures, program modules or other data in a modulated data signal (e.g., a carrier wave) or other transport mechanism. By way of example, and not limitation, communication interface 770 may couple to wired media (e.g., a wired network, direct-wired connection, etc.) and/or wireless media (e.g., a wireless network, a wireless connection utilizing acoustic, RF, infrared, or other wireless signaling, etc.).

Input component 780 may include any component for enabling a user, system, etc. to provide an input to system 700. For example, input component 780 may include a keyboard, mouse, pen, voice input device (e.g., microphone), touch input device (e.g., touchscreen), visual input device (e.g., optical sensor, camera, etc.), accelerometer, proximity sensor, some combination thereof, etc.

As shown in FIG. 7, output component 790 may include any component for enabling system 700 to provide an output to a user, system, etc. For example, output component 790 may include a display device (e.g., LCD, LED, OLED, plasma, CRT, etc.), speaker, printer, some combination thereof, etc.

Graphics processor 750 may perform graphics processing operations on graphical data stored in frame buffer 760 or another memory (e.g., 720, 740, 745, etc.) of computer system platform 700. Graphical data stored in frame buffer 760 may be accessed, processed, and/or modified by components (e.g., graphics processor 750, processor 710, etc.) of computer system platform 700 and/or components of other systems/devices. Additionally, the graphical data may be accessed (e.g., by graphics processor 750) and displayed on an output device coupled to computer system platform 700. Accordingly, memory 720, removable storage 740, non-removable storage 745, frame buffer 760, or a combination thereof, may comprise instructions that when executed on a processor (e.g., 710, 750, etc.) implement a method of enabling a user to interact with an enterprise application and access enterprise data (e.g., in accordance with process 600 of FIGS. 6A-6D), a method of modifying execution of an application on a portable electronic device (e.g., in accordance with process 1400 of FIG. 14), some combination thereof, etc.

Using a Module to Modify the Behavior of a Native Application

Native enterprise applications (e.g., 211), in one embodiment, may be difficult to configure once downloaded to the portable electronic device (e.g., 110). A user may therefore be required to download a new version of the native enterprise application to modify a graphical user interface (GUI) or another feature of the native enterprise application, which can be tedious, time consuming and expensive. Also, a developer who creates a new version of the native enterprise application or a patch for the native application may be unable to automate a software update of the native enterprise application since a user may be required to manually download the new version of the native enterprise application. As such, it may be difficult to provide a consistent "look and feel" (e.g., with similar user interface elements, colors, backgrounds, logos, etc.), using the native application, across multiple enterprise applications (e.g., each associated with the same corporation or entity). Additionally, one or more enterprise applications may benefit from an updated graphical user interface (e.g., with additional user interface elements, different user interface elements, different user interface behavior, etc.), and thus, difficulty in updating the native application may inhibit a user's ability to interact with remotely-executed enterprise applications using the portable electronic device.

Accordingly, a need exists to modify the execution of a native enterprise application running on a portable electronic device without requiring a user to download a new version of the native enterprise application. More specifically, a need exists to modify the appearance and/or behavior of a graphical user interface generated by a native enterprise application running on a portable electronic device. Additionally, a need exists to alter the data sharing between enterprise applications running on a remote system. Embodiments of the present invention provide novel solutions to these needs and others as described below.

Embodiments of the present invention are directed to a method and system for modifying the execution of a native application (e.g., native enterprise application 211) running on a portable electronic device (e.g., 110). More specifically, a module (e.g., a program module) may be downloaded and executed by a portable electronic device to modify the execution of a native enterprise application running on the portable electronic device, where the native enterprise application enables user interaction with remotely-executed enterprise applications which are used to generate data (e.g., enterprise data, enterprise content, enterprise web content, etc.) for display on the portable electronic device. The module may enable modification of the appearance and/or behavior of a graphical user interface generated by the native enterprise application (e.g., by replacing some or all of the program instructions of the native application used to implement the graphical user interface). And in one embodiment, the module may enable alteration of the data sharing (e.g., changing a location for storing the shared data, changing or creating rules related to how the enterprise applications share data, etc.) between the enterprise applications running on the remote system.

As such, the execution of a native enterprise application (e.g., 211) may be modified, by executing a module on the portable electronic device, without requiring a user to download a new version of the native enterprise application. Additionally, by causing a module to be downloaded to and executed by the portable electronic device, a developer or another third party may automatically update the native enterprise application or otherwise modify the execution of a native enterprise application running on the portable electronic device. In this manner, embodiments provide a convenient mechanism for configuring or modifying the execution of a native enterprise application running on a portable electronic device.

Figure 8:
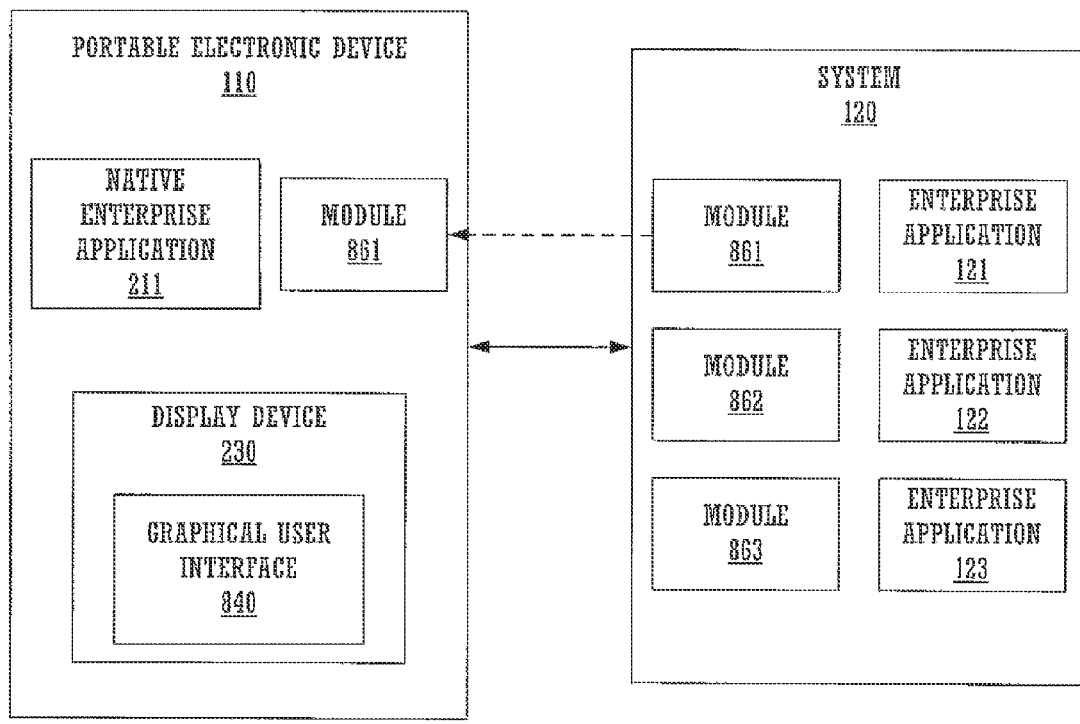
FIG. 8 shows an exemplary system for accessing and executing one or more modules to alter the execution of a native enterprise application running on a portable electronic device in accordance with one embodiment of the present invention.

FIG. 8 shows an exemplary system for accessing and executing one or more modules to alter the execution of native enterprise application 211 running on portable electronic device 110 in accordance with one embodiment of the present invention. As shown in FIG. 8, a module (e.g., 861) may be downloaded (e.g., from system 120) to portable electronic device 110 and executed thereon (e.g., while native enterprise application 211 is running, while native enterprise application 211 is not running, etc.) for modifying or enhancing the execution of native enterprise application 211. For example, execution of module 861 on portable electronic device may alter at least one feature of GUI 840 (e.g., including one or more of regions 310, 320 and 330 as depicted, for example, in FIG. 3. FIG. 4, etc.) which is displayed on display device 230 by native enterprise application 211. Alternatively, module 861 may be used to alter the data sharing (e.g., changing a location for storing the shared data, changing or creating rules related to how the enterprise applications share data, etc) between enterprise applications (e.g., 121, 122, 123, etc.) running on a remote system (e.g., 120).

Modules 861-863 may be application-specific (e.g., specific to one or more of enterprise applications 121-123) in one embodiment. For example, execution of module 861 may make modifications to native enterprise application 211 which relate to enterprise application 121, while execution of module 862 may make modifications to native enterprise application 211 which relate to enterprise application 122. In this manner, native enterprise application 211 may be easily configured or customized for one or more enterprise applications by executing a corresponding module (e.g., 861, 862, 863, etc.).

In one embodiment, execution of an application-specific module (e.g., 861, 862, 863, etc.) may enable application-specific customization of the appearance and/or behavior of GUI 840. For example, native enterprise application 211 may display user interface elements, buttons, images, etc. on GUI 840 which are specific to one or more enterprise applications in response to an execution of a module which corresponds to the one or more enterprise applications. As another example, native enterprise application 211 may implement graphical user interface behavior (e.g., how the GUI responds to user inputs, the function or functions assigned to each user interface element, etc.) which is specific to one or more enterprise applications in response to an execution of a module which corresponds to the one or more enterprise applications.

Execution of one or more modules (e.g., 861, 862, etc.) may implement or provide a consistent "look and feel" across multiple enterprise applications (e.g., 121, 122, etc.). For example, execution of one or more modules may provide multiple enterprise applications with similar user interface elements, similar colors, similar backgrounds, similar logos, etc. As such, the modules may be used, in one embodiment, to provide a consistent "look and feel" across multiple enterprise applications associated with a corporation, entity, person, etc. The "look and feel" of the graphical user interface (e.g., 840) may indicate or otherwise identify the associated corporation, entity, person, etc.

Module 861 may be any portion of code capable of altering the execution of native enterprise application 211. Module 861 may be coded in objective C, JAVA C, C++, C#, another language, some combination thereof, etc. In one embodiment, module 861 may be an executable file capable of execution by portable electronic device 110.

Additionally, module 861 may be communicated to portable electronic device 110 from system 120 over interface 115. In one embodiment, module 861 may be communicated simultaneously with enterprise content. Alternatively, module 861 may be communicated separately from enterprise content.

In one embodiment, module 861 may be stored locally on portable electronic device 110, and thus, may not be downloaded to portable electronic device 110 before execution, in another embodiment, module 861 may be downloaded from system (e.g., a server or other system separate from portable electronic device 110) other than system 120. Additionally, although FIG. 8 depicts only three modules (e.g., 861, 862 and 863), it should be appreciated that a larger or smaller number of modules may be stored on system 120 and/or accessed by portable electronic device 110 in other embodiments.

Figure 9:
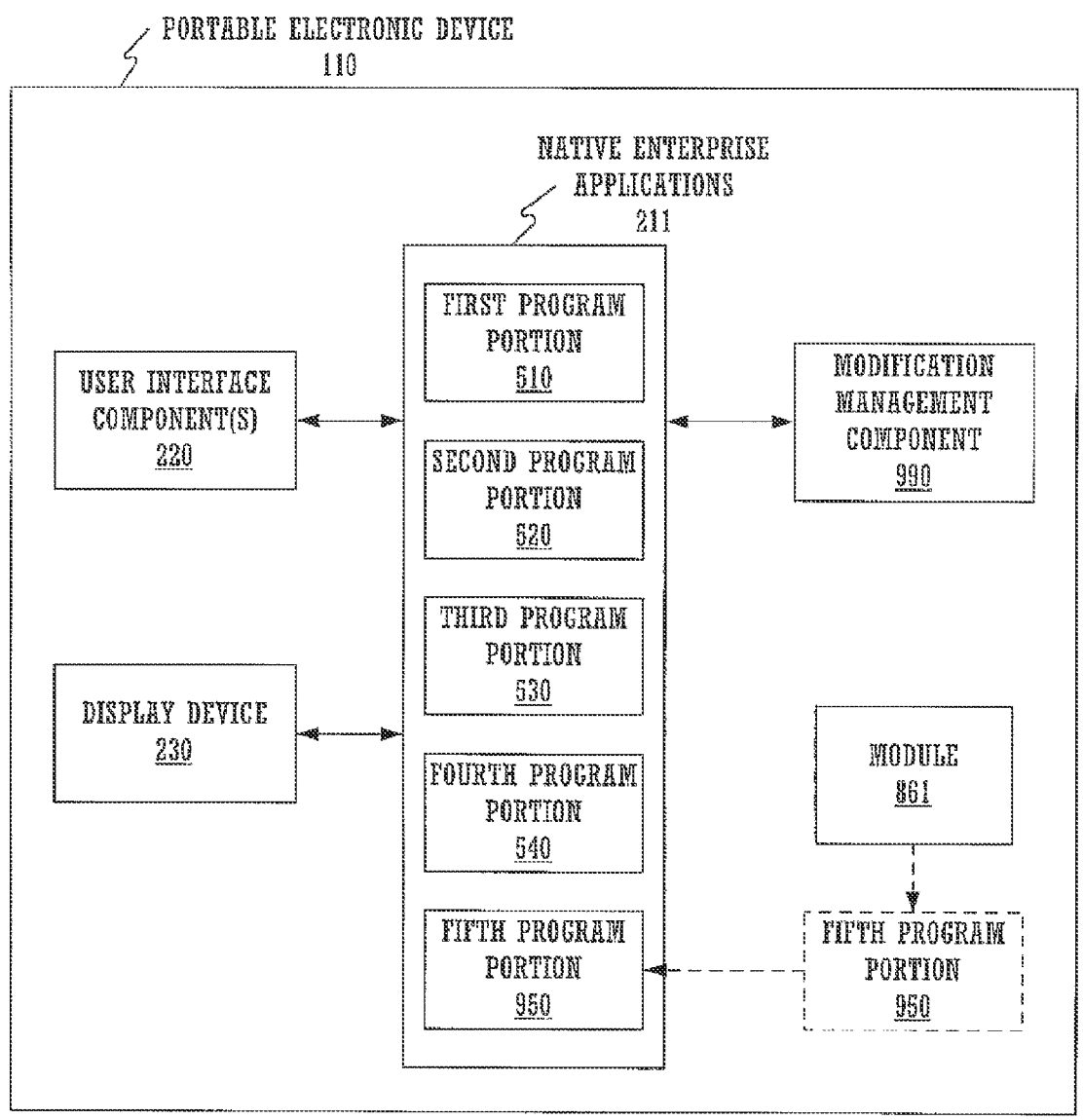
FIG. 9 shows an exemplary modification of a native enterprise application in response to an execution of a module on a portable electronic device in accordance with one embodiment of the present invention.

FIG. 9 shows an exemplary modification of native enterprise application 211 in response to an execution of module 861 on portable electronic device 110 in accordance with one embodiment of the present invention. As shown in FIG. 9, execution of module 861 may generate fifth program portion 950 which may be executed in lieu of or in combination with existing program portions (e.g., 510, 520, 530, 540, etc.) of native enterprise application 211 to modify at least one feature of native enterprise application 211.

Modification management component 990 may manage the execution of module 861 and/or the modification of native enterprise application 211. For example, component 990 may perform scheduling operations to cause fifth program portion 950 to be executed in lieu of fourth program portion 540, thereby modifying the execution of native enterprise application 211 by replacing fourth program portion 540. Alternatively, component 990 may perform scheduling operations to cause fifth program portion 950 to be executed in combination with fourth program portion 540, thereby modifying the execution of native enterprise application 211 by supplementing fourth program portion 540.

Fifth program portion 950 may include instructions or data used to generate GUI 840, and thus, execution of fifth program portion 950 may change the appearance or behavior of GUI 840 in one embodiment. Alternatively, fifth program portion 950 may include instructions or data used to implement data sharing between enterprise applications (e.g., 121, 122, 123, etc.) executed by remote system 120, and thus, execution of fifth program portion 950 may alter the data sharing between enterprise applications in one embodiment.

Although FIG. 9 depicts only one program portion (e.g., 950) generated in response to execution of module 861, it should be appreciated that execution of module 861 may generate more than one program portion in other embodiments. Additionally, it should be appreciated that component 990 may be included within native enterprise application 211 in one embodiment.

Figure 10:
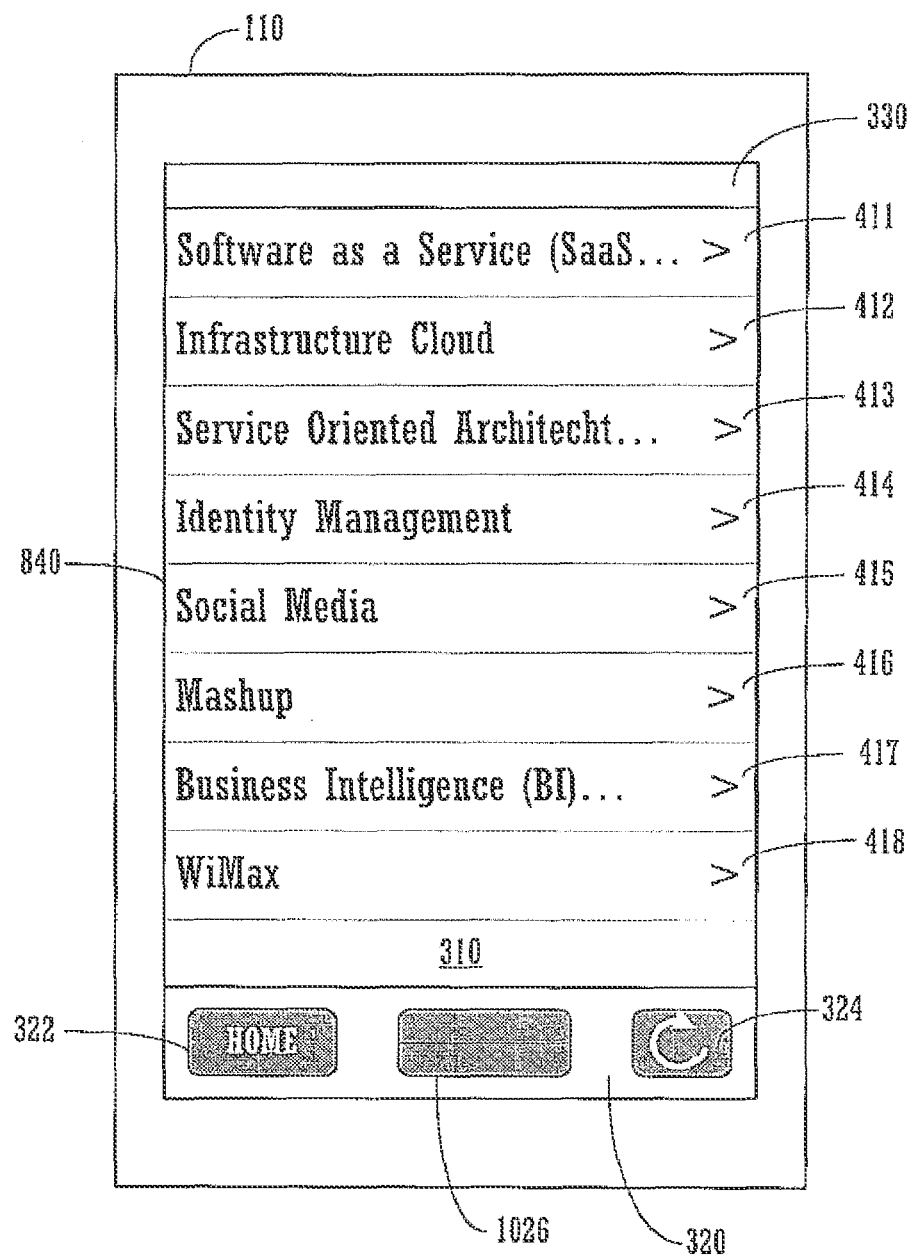
FIG. 10 shows an exemplary modification to the appearance of an on-screen graphical user interface by displaying an additional user interface element in accordance with one embodiment of the present invention.

FIG. 10 shows an exemplary modification to the appearance of on-screen graphical user interface 840 by displaying an additional user interface element in accordance with one embodiment of the present invention. As shown in FIG. 10, native user interface element 1026 may be displayed using GUI 840 in response to execution of a module (e.g., 861), where native user interface element 1026 may not have been displayed or hidden prior to execution of the module (e.g., as shown in FIG. 4). Native user interface element 1026 may function similarly or analogously to native user interface elements 322 and/or 324 in one embodiment.

It should be appreciated that GUI 840 may be updated to reflect the modification (e.g., the addition of native user interface element 1026) white native enterprise application 211 is running (e.g., as a dynamic update to GUI 840). In this case, the module (e.g., 861) may be executed contemporaneously with execution of native enterprise application 211 and/or display of GUI 840. Alternatively, in one embodiment, the module (e.g., 861) may be executed when native enterprise application 211 is not running (e.g., when GUI 840 is not displayed), and thus, GUI 840 may be updated upon the subsequent execution of native enterprise application 211 in one embodiment. In this case, the module may act as a "patch" to modify native enterprise application 211 while native enterprise application 211 is not running.

Although FIG. 10 shows a modification to GUI 840 within region 320, it should be appreciated that execution of the module (e.g., 861) may cause a modification to the appearance of any other region (e.g., 310, 330, etc.) of GUI 840 in other embodiments. Additionally, although FIG. 10 depicts modification of the appearance of GUI 840 by adding a native user interface element (e.g., 1026), it should be appreciated that any other type of appearance modification (e.g., removal of a user interface element, addition of a different type of user interface element such as an enterprise user interface element, addition or alteration of an image which is not capable of interaction with a user, etc.) may be performed in response to execution of the module (e.g., 861) in other embodiments.

Figure 11:
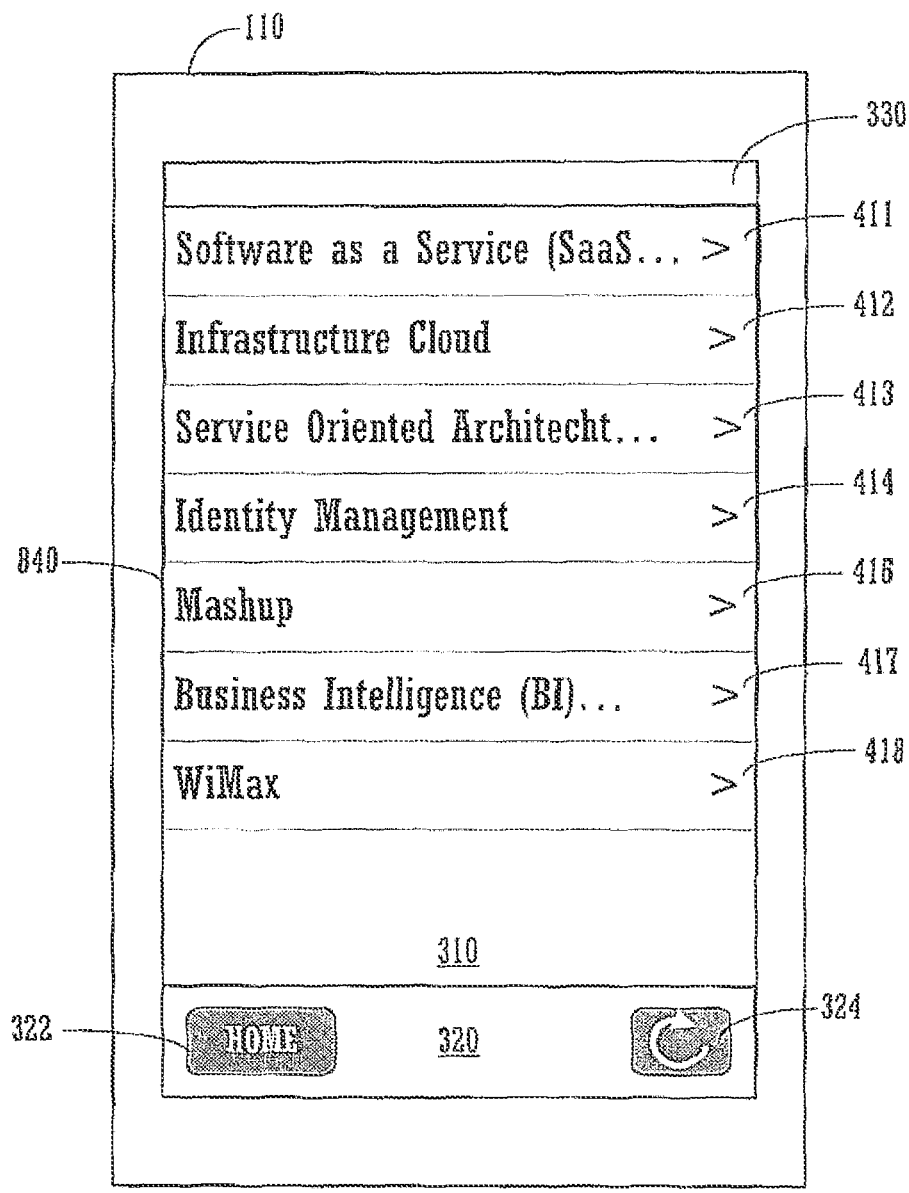
FIG. 11 shows an exemplary modification to the appearance of an on-screen graphical user interface by removing a user interface element in accordance with one embodiment of the present invention.

FIG. 11 shows an exemplary modification to the appearance of on-screen graphical user interface 840 by removing a user interface element in accordance with one embodiment of the present invention. As shown in FIG. 11, enterprise user interface element 415 (e.g., shown in FIG. 4) may be removed from GUI 840 or hidden in response to execution of a module (e.g., 861). Accordingly, in one embodiment, enterprise user interface elements 416-418 may be shifted upward to fill the void left by the removal of enterprise user interface element 415.

It should be appreciated that GUI 840 may be updated to reflect the modification (e.g., the removal of enterprise user interface element 415) while native enterprise application 211 is running (e.g., as a dynamic update to GUI 840). In this case, the module (e.g., 861) may be executed contemporaneously with execution of native enterprise application 211 and/or display of GUI 840. Alternatively, in one embodiment, the module (e.g., 861) may be executed when native enterprise application 211 is not running (e.g., when GUI 840 is not displayed), and thus, GUI 840 may be updated upon the subsequent execution of native enterprise application 211 in one embodiment. In this case, the module may act as a "patch" to modify native enterprise application 211 while native enterprise application 211 is not running.

Although FIG. 11 shows a modification to GUI 840 within region 310, it should be appreciated that execution of the module (e.g., 861) may cause a modification to the appearance of any other region (e.g., 320, 330, etc.) of GUI 840 in other embodiments. Additionally, although FIG. 11 depicts modification of the appearance of GUI 840 by removing an enterprise user interface element (e.g., 415), it should be appreciated that any other type of appearance modification (e.g., addition of a user interface element, removal of a different type of user interface element such as a native user interface element, addition or alteration of an image which is not capable of interaction with a user, etc.) may be performed in response to execution of the module (e.g., 861) in other embodiments.

Figure 12:
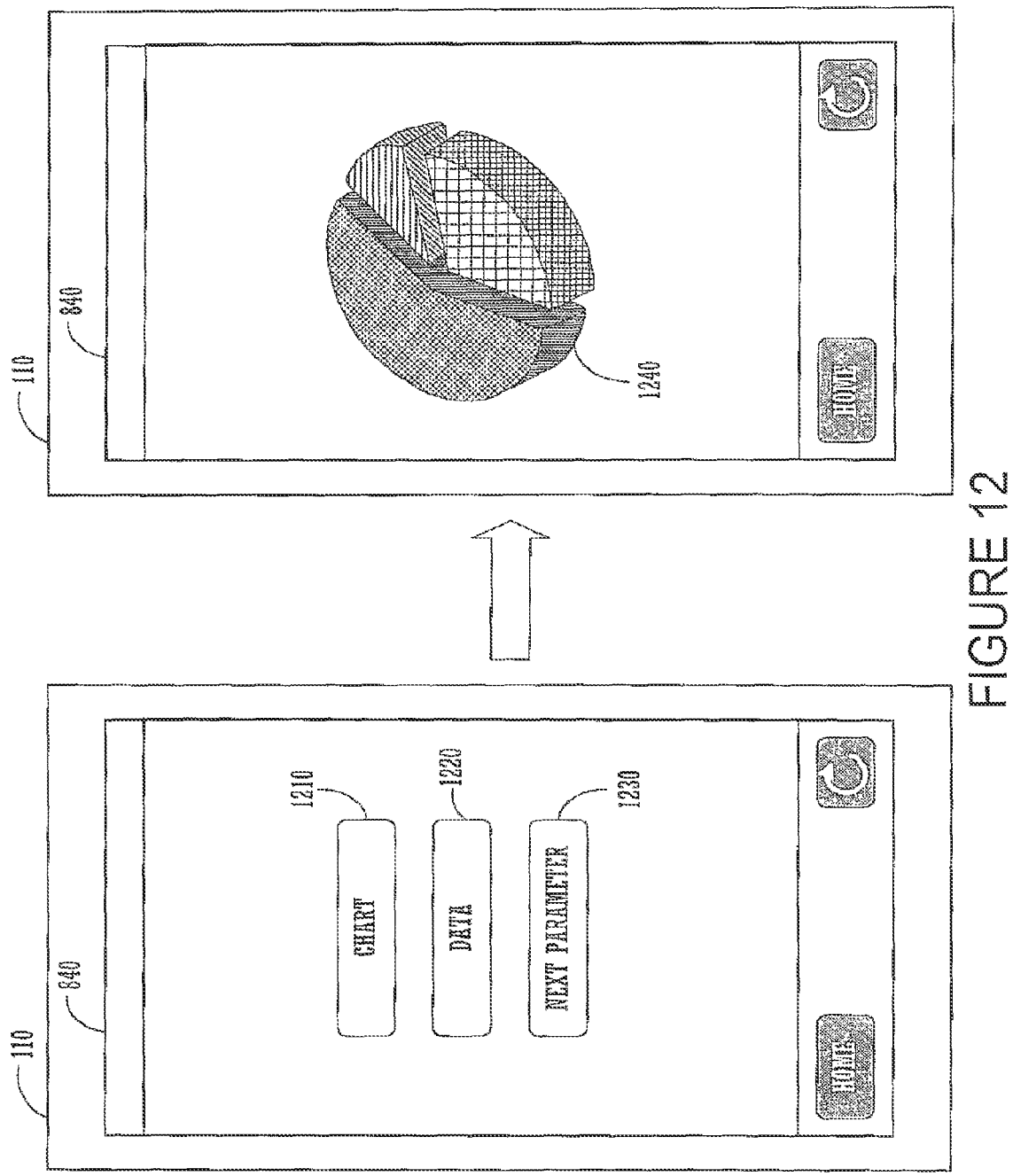
FIG. 12 shows an exemplary flow of a graphical user interface before a modification to its behavior in accordance with one embodiment of the present invention.
Figure 13:
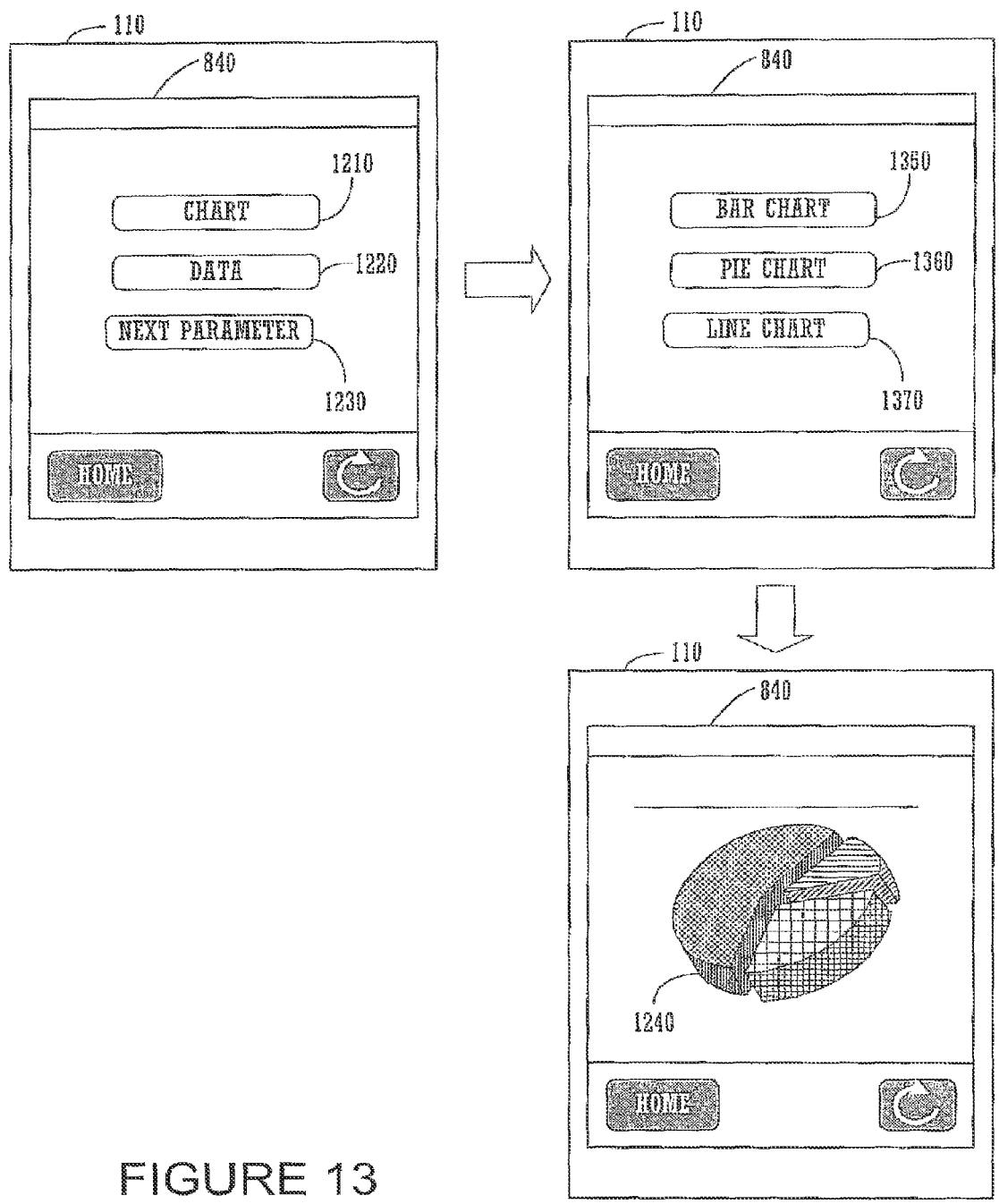
FIG. 13 shows an exemplary flow of a graphical user interface after a modification to its behavior in accordance with one embodiment of the present invention.

FIG. 12 shows an exemplary flow of graphical user interface 840 before a modification to its behavior in accordance with one embodiment of the present invention, while FIG. 13 shows an exemplary flow of graphical user interface 840 after a modification to its behavior in accordance with one embodiment of the present invention. As shown in FIG. 12, GUI 840 includes exemplary user interface elements 1210, 1220 and 1230, where a user interaction (e.g., a mouse click, a touch screen press, etc.) with element 1210 may initiate the display of pie chart 1240 in one embodiment. In this manner, element 1210 may be used to display pie chart 1240 prior to execution of a module (e.g., 861) on the portable electronic device (e.g., 110).

Alternatively, after execution of a module (e.g., 861) on the portable electronic device (e.g., 110), a user interaction (e.g., a mouse click, a touch screen press, etc.) with element 1210 may initiate the display of user interface elements 1350, 1360 and 1370 as shown in FIG. 13. A subsequent user interaction (e.g., a mouse click, a touch screen press, etc.) with user interface element 1350, for example, may then initiate the display of the display of pie chart 1240 in one embodiment. Accordingly, execution of a module (e.g., 861) may change the function of element 1210 (e.g., from initiating the display of pie chart 1240 as shown in FIG. 12 to initiating the display of elements 1350-1370 as shown in FIG. 14), thereby modifying the behavior of GUI 840.

User interface elements 1210-1230 and/or pie chart 1240 may be generated based upon data (e.g., enterprise data, enterprise content, etc.) communicated from a remote system (e.g., 120) to the portable electronic device (e.g., 110) in one embodiment. Additionally, one or more of user interface elements 1210-1230 may be enterprise user interface elements similar to enterprise user interface elements 311-314 of FIG. 3 and/or enterprise user interface elements 411-418 of FIG. 4.

Although FIGS. 12 and 13 depict one example of a modification to the behavior of a GUI, it should be appreciated that other behavior modifications may be performed responsive to an execution of a module (e.g., 861) in other embodiments. For example, different or additional data may be communicated to a remote system (e.g., 120) in response to a user interaction with a user interface element (e.g., 1210, 1220, 1230, 1350, 1360, 1370, etc.) of GUI 840 in one embodiment. In this manner, changes to a GUI which are not apparent to a user (e.g., communicating different data in response to a user interaction with GUI 840) may be performed in response to execution of a module (e.g., 861) in one embodiment.

Figure 14:
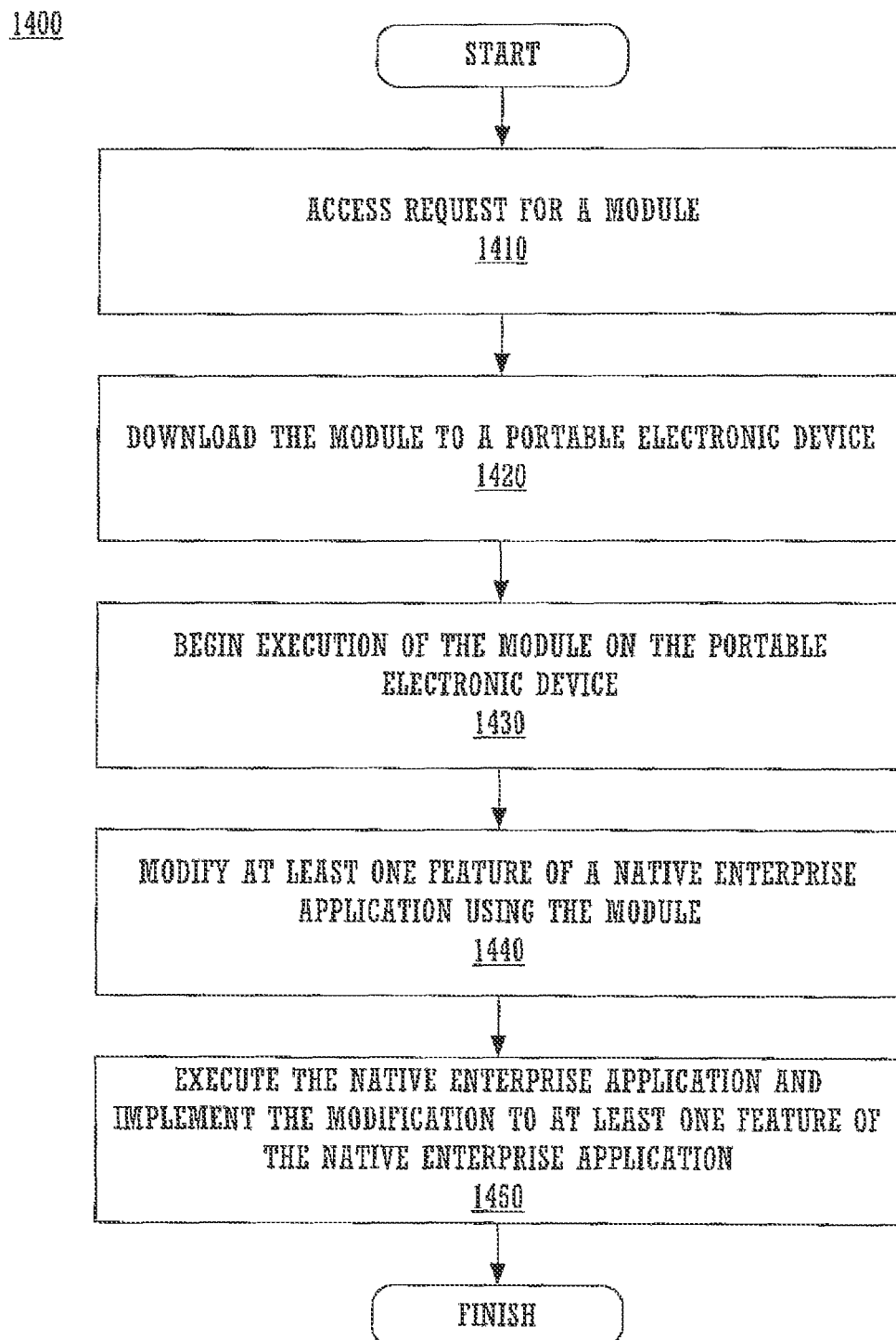
FIG. 14 shows an exemplary computer-implemented process for modifying the execution of a native application running on a portable electronic device in accordance with one embodiment of the present invention.

FIG. 14 shows exemplary computer-implemented process 1400 for modifying the execution of a native application running on a portable electronic device in accordance with one embodiment of the present invention. As shown in FIG. 14, step 1410 involves accessing a request for a module (e.g., 861). The request may be generated by a user of a portable electronic device (e.g., 110) using the portable electronic device (e.g., GUI 840 of portable electronic device 110) or another system (e.g., computer system 150 of FIG. 1). Alternatively, the request may be generated by a third party (e.g., a developer of native enterprise application 211, etc.) using a system which is not portable electronic device 110.

Step 1420 involves downloading the module to the portable electronic device. For example, module 861 may be downloaded to portable electronic device 110 responsive to the request accessed in step 1410. The module (e.g., 861) may be downloaded from a remote system (e.g., 120, another system or server, etc.) which is not portable electronic device 110 in one embodiment.

As shown in FIG. 14, step 1430 involves beginning execution of the module (e.g., 861) on the portable electronic device (e.g., 110). Step 1430 may be performed during execution of a native application (e.g., native enterprise application 211) modified in step 1440. Alternatively, step 1430 may be performed while the native application (e.g., native enterprise application 211) modified in step 1440 is not running.

Step 1440 involves modifying at least one feature of a native enterprise application (e.g., 211) using the module (e.g., 861). For example, execution of the module may generate program instructions (e.g., fifth program portion 950 of FIG. 9) which replace and/or supplement the existing program instructions of the native enterprise application (e.g., 211), and therefore, execution of the new program instructions (e.g., during execution of native enterprise application 211) may alter at least one feature of the native enterprise application (e.g., 211). The feature or features modified by execution of the module may include an appearance and/or behavior of a GUI (e.g., 840) in one embodiment. Alternatively, execution of the module may alter the data sharing (e.g., changing a location for storing the shared data, changing or creating rules related to how the enterprise applications share data, etc.) between enterprise applications (e.g., 121, 122, 123, etc.) running on a remote system (e.g., 120). And in one embodiment, another feature of the native enterprise application (e.g., 211) may be modified in response to execution of the module (e.g., 861) in step 1440.

As shown in FIG. 14, step 1450 involves executing the native enterprise application (e.g., 211) and implementing the modification to the at least one feature of the native enterprise application. For example, data downloaded from a remote system (e.g., 120) may be displayed differently using the graphical user interface (e.g., 840) during execution of native enterprise application (e.g., 211) in step 1450. Alternatively, the manner in which enterprise applications (e.g., 121, 122, 123, etc.) share data may be altered during execution of native enterprise application (e.g., 211) in step 1450. And in one embodiment, another change to the functionality of the native enterprise application (e.g., 211) may be implemented during execution of the native enterprise application (e.g., 211) in step 1450.

In the foregoing specification, embodiments of the invention have been described with reference to numerous specific details that may vary from implementation to implementation. Thus, the sole and exclusive indicator of what is, and is intended by the applicant to be, the invention is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

What is claimed is:

1. A computer-implemented method comprising:
    receiving data that specifies one or more updated conditions under which a first server-based enterprise application and a second server-based enterprise application may share certain enterprise data from a portable computing device that includes (i) a first native enterprise application that corresponds to the first server-based enterprise application, (ii) a second native enterprise application that corresponds to the second server-based enterprise application, and (iii) data that specifies one or more conditions under which the first server-based enterprise application and the second server-based enterprise application may share the certain enterprise data;
    modifying execution of the first native enterprise application or the second native enterprise application to reflect the updated conditions under which the first server-based enterprise application and the second server-based enterprise application may share the certain enterprise data;
    receiving, by the first native application after modifying execution of the first native enterprise application or the second native enterprise application to reflect the updated conditions under which the first server-based enterprise application and the second server-based enterprise application may share the certain enterprise data, input indicating an update for particular enterprise data;
    providing, by the first native application, the update for the particular enterprise data to the first server-based enterprise application; and
    receiving, by the second native application, the update for the particular enterprise data from the second server-based enterprise application.

2. The method of claim 1 wherein the second native application is prohibited by an operating system on the portable computing device from sharing enterprise data with the first native application.

3. The method of claim 1 wherein receiving the data that specifies the one or more updated conditions under which the first server-based enterprise application and the second server-based enterprise application may share the certain enterprise data comprises receiving data that specifies a change in a location at which enterprise data shared by the first server-based enterprise application and the second server-based enterprise application is stored.

4. The method of claim 1 wherein modifying execution of the first native enterprise application or the second native enterprise application to reflect the updated conditions under which the first server-based enterprise application and the second server-based enterprise application may share the certain enterprise data comprises modifying execution of the first native enterprise application while the first native enterprise application is executing or the second native enterprise application while the second native enterprise application is executing to reflect the updated conditions under which the first server-based enterprise application and the second server-based enterprise application may share the certain enterprise data.

5. The method of claim 1 wherein modifying the execution of the first native enterprise application or the second native enterprise application to reflect the updated conditions under which the first server-based enterprise application and the second server-based enterprise application may share the certain enterprise data comprises:
    receiving, by the portable computing device, a module for the first native enterprise application or the second native enterprise application; and
    executing, by the portable computing device, the received module to modify the first native enterprise application or the second native enterprise application.

6. A system comprising:
    a portable computing device and one or more storage devices storing instructions that are operable, when executed by the portable computing device, to cause the portable computing device to perform operations comprising:

receiving data that specifies one or more updated conditions under which a first server-based enterprise application and a second server-based enterprise application may share certain enterprise data from the portable computing device that includes (i) a first native enterprise application that corresponds to the first server-based enterprise application, (ii) a second native enterprise application that corresponds to the second server-based enterprise application, and (iii) data that specifies one or more conditions under which the first server-based enterprise application and the second server-based enterprise application may the share certain enterprise data;

modifying execution of the first native enterprise application or the second native enterprise application to reflect the updated conditions under which the first server-based enterprise application and the second server-based enterprise application may share the certain enterprise data;

receiving, by the first native application after modifying execution of the first native enterprise application or the second native enterprise application to reflect the updated conditions under which the first server-based enterprise application and the second server-based enterprise application may share the certain enterprise data, input indicating an update for particular enterprise data;

providing, by the first native application, the update for the particular enterprise data to the first server-based enterprise application; and receiving, by the second native application, the update for the particular enterprise data from the second server-based enterprise application.

7. The system of claim 6 wherein the second native application is prohibited by an operating system on the portable computing device from sharing enterprise data with the first native application.

8. The system of claim 6 wherein receiving the data that specifies the one or more updated conditions under which the first server-based enterprise application and the second server-based enterprise application may share the certain enterprise data comprises receiving data that specifies a change in a location at which enterprise data shared by the first server-based enterprise application and the second server-based enterprise application is stored.

9. The system of claim 6 wherein modifying execution of the first native enterprise application or the second native enterprise application to reflect the updated conditions under which the first server-based enterprise application and the second server-based enterprise application may share the certain enterprise data comprises modifying execution of the first native enterprise application while the first native enterprise application is executing or the second native enterprise application while the second native enterprise application is executing to reflect the updated conditions under which the first server-based enterprise application and the second server-based enterprise application may share the certain enterprise data.

10. The system of claim 6 wherein modifying the execution of the first native enterprise application or the second native enterprise application to reflect the updated conditions under which the first server-based enterprise application and the second server-based enterprise application may share the certain enterprise data comprises:

receiving, by the portable computing device, a module for the first native enterprise application or the second native enterprise application; and executing, by the portable computing device, the received module to modify the first native enterprise application or the second native enterprise application.

11. A non-transitory computer-readable medium storing software comprising instructions executable by a portable computing device which, upon such execution, cause the portable computing device to perform operations comprising:

receiving data that specifies one or more updated conditions under which a first server-based enterprise application and a second server-based enterprise application may share certain enterprise data from the portable computing device that includes (i) a first native enterprise application that corresponds to the first server-based enterprise application, (ii) a second native enterprise application that corresponds to the second server-based enterprise application, and (iii) data that specifies one or more conditions under which the first server-based enterprise application and the second server-based enterprise application may share the certain enterprise data;

modifying execution of the first native enterprise application or the second native enterprise application to reflect the updated conditions under which the first server-based enterprise application and the second server-based enterprise application may share the certain enterprise data;

receiving, by the first native application after modifying execution of the first native enterprise application or the second native enterprise application to reflect the updated conditions under which the first server-based enterprise application and the second server-based enterprise application may share the certain enterprise data, input indicating an update for particular enterprise data;

providing, by the first native application, the update for the particular enterprise data to the first server-based enterprise application; and receiving, by the second native application, the update for the particular enterprise data from the second server-based enterprise application.

12. The computer-readable medium of claim 11 wherein the second native application is prohibited by an operating system on the portable computing device from sharing enterprise data with the first native application.

13. The computer-readable medium of claim 11 wherein receiving the data that specifies the one or more updated conditions under which the first server-based enterprise application and the second server-based enterprise application may share the certain enterprise data comprises receiving data that specifies a change in a location at which enterprise data shared by the first server-based enterprise application and the second server-based enterprise application is stored.

14. The computer-readable medium of claim 11 wherein modifying execution of the first native enterprise application or the second native enterprise application to reflect the updated conditions under which the first server-based enterprise application and the second server-based enterprise application may share the certain enterprise data comprises modifying execution of the first native enterprise application while the first native enterprise application is executing or the second native enterprise application while the second native enterprise application is executing to reflect the updated conditions under which the first server-based enterprise application and the second server-based enterprise application may share the certain enterprise data.

15. The computer-readable medium of claim 11 wherein modifying the execution of the first native enterprise application or the second native enterprise application to reflect the updated conditions under which the first server-based enterprise application and the second server-based enterprise application may share the certain enterprise data comprises:
  receiving, by the portable computing device, a module for the first native enterprise application or the second native enterprise application; and
  executing, by the portable computing device, the received module to modify the first native enterprise application or the second native enterprise application.

* * * * *